(12) United States Patent
Accardo et al.

(10) Patent No.: US 9,031,720 B2
(45) Date of Patent: May 12, 2015

(54) FAST VERTICAL TRAJECTORY PREDICTION METHOD FOR AIR TRAFFIC MANAGEMENT, AND RELEVANT ATM SYSTEM

(75) Inventors: Domenico Accardo, Rome (IT); Antonio Moccia, Rome (IT); Michele Grassi, Rome (IT); Urbano Tancredi, Rome (IT); Lucio Caminiti, Rome (IT); Luigi Fiorillo, Rome (IT); Alberto Leardi, Rome (IT); Giuseppe Maresca, Rome (IT)

(73) Assignee: Selex Sistemi Integrati S.p.A., Rome (IT)

( * ) Notice: Subject to any disclaimer, the term of this patent is extended or adjusted under 35 U.S.C. 154(b) by 408 days.

(21) Appl. No.: 13/324,047

(22) Filed: Dec. 13, 2011

(65) Prior Publication Data
US 2012/0158220 A1    Jun. 21, 2012

(30) Foreign Application Priority Data

Dec. 20, 2010   (IT) .............................. RM2010A0672

(51) Int. Cl.
   *G08G 5/00*   (2006.01)
   *G05D 1/06*   (2006.01)
(52) U.S. Cl.
   CPC ............ *G08G 5/0082* (2013.01); *G05D 1/0646* (2013.01); *G08G 5/0052* (2013.01); *G08G 5/0065* (2013.01)
(58) Field of Classification Search
   CPC ................................................ G01C 21/005
   See application file for complete search history.

(56) References Cited

U.S. PATENT DOCUMENTS

| | | | |
|---|---|---|---|
| 5,337,982 A * | 8/1994 | Sherry | 244/186 |
| 6,163,743 A * | 12/2000 | Bomans et al. | 701/3 |
| 6,870,490 B2 * | 3/2005 | Sherry et al. | 340/970 |
| 7,412,324 B1 * | 8/2008 | Bagge et al. | 701/120 |
| 7,877,197 B2 * | 1/2011 | Lewis et al. | 701/120 |
| 8,131,410 B2 * | 3/2012 | Nikolic et al. | 701/15 |
| 8,234,058 B1 * | 7/2012 | Barber et al. | 701/120 |
| 8,255,147 B2 * | 8/2012 | Roberts et al. | 701/120 |
| 8,456,328 B2 * | 6/2013 | Karthikeyan et al. | 340/945 |
| 8,509,967 B2 * | 8/2013 | Grattard et al. | 701/3 |
| 2003/0058134 A1 * | 3/2003 | Sherry et al. | 340/945 |
| 2003/0093219 A1 * | 5/2003 | Schultz et al. | 701/202 |
| 2003/0193410 A1 * | 10/2003 | Chen et al. | 340/971 |
| 2004/0078136 A1 * | 4/2004 | Cornell et al. | 701/120 |
| 2005/0182528 A1 * | 8/2005 | Dwyer et al. | 701/3 |
| 2005/0200501 A1 * | 9/2005 | Smith | 340/963 |
| 2005/0283281 A1 * | 12/2005 | Hartmann et al. | 701/4 |
| 2007/0142981 A1 * | 6/2007 | Gutierrez-Castaneda et al. | 701/3 |

(Continued)

*Primary Examiner* — Jonathan M Dager
(74) *Attorney, Agent, or Firm* — Ladas & Parry LLP

(57) ABSTRACT

A method and system for the prediction of aircrafts vertical trajectory, in particular for Air Traffic Management, using the following flight calculation modules: Take-off; Climb; Cruise; Descent; and Landing, corresponding to the relevant flight phases, in which:
   the calculation of the predicted aircraft trajectory is effected by using a set of TEM equations using, as output variables, the vertical rate of climb or descent, the true air speed, the energy share factor, the thrust and the drag, the mass of the aircraft modeled as point-mass, and using, as input variables, the Mach number depending on true air speed and temperature and altitude, the gravity acceleration, and the fuel flow, and the flight path angle;
   the calculation of the predicted aircraft trajectory for Cruise phase, wherein only the mass is varies, is performed by using the following analytical solution to said set of TEM equations.

22 Claims, 13 Drawing Sheets

(56) References Cited

U.S. PATENT DOCUMENTS

| | | |
|---|---|---|
| 2008/0027594 A1* | 1/2008 | Jump et al. .................. 701/11 |
| 2008/0051947 A1* | 2/2008 | Kemp ............................ 701/3 |
| 2008/0097658 A1* | 4/2008 | Shue et al. .................... 701/8 |
| 2008/0300738 A1* | 12/2008 | Coulmeau et al. ............ 701/3 |
| 2009/0012660 A1* | 1/2009 | Roberts et al. ................ 701/3 |
| 2009/0312893 A1* | 12/2009 | Dwyer et al. ................ 701/14 |
| 2009/0319103 A1* | 12/2009 | Dwyer et al. ................ 701/14 |
| 2010/0082185 A1* | 4/2010 | Grattard et al. ............... 701/3 |
| 2010/0145599 A1* | 6/2010 | Wise et al. ................. 701/120 |
| 2010/0250026 A1* | 9/2010 | Deker et al. ................... 701/3 |
| 2010/0250117 A1* | 9/2010 | Deker et al. ............... 701/202 |
| 2011/0087428 A1* | 4/2011 | Barnetche et al. .......... 701/200 |
| 2011/0118908 A1* | 5/2011 | Boorman et al. ............ 701/14 |
| 2011/0137495 A1* | 6/2011 | Sacle et al. .................... 701/3 |
| 2011/0295501 A1* | 12/2011 | Gutierez-Castaneda et al. ............................ 701/206 |
| 2012/0078450 A1* | 3/2012 | Marche et al. ................. 701/6 |
| 2012/0215435 A1* | 8/2012 | Subbu et al. ............... 701/120 |
| 2012/0290155 A1* | 11/2012 | Dulac ........................... 701/18 |
| 2013/0173090 A1* | 7/2013 | Rieunier et al. ................ 701/3 |
| 2013/0221164 A1* | 8/2013 | Klooster ...................... 244/180 |
| 2013/0317672 A1* | 11/2013 | Magana Casado et al. ....... 701/3 |

* cited by examiner

FAST VERTICAL TRAJECTORY PREDICTION METHOD FOR AIR TRAFFIC MANAGEMENT, AND RELEVANT ATM SYSTEM

BACKGROUND OF THE INVENTION

1 Field of the Invention

The present invention concerns a fast vertical trajectory prediction method for air traffic management (ATM), and relevant ATM system.

More in detail, the present invention concerns a method which is able to calculate the vertical trajectory of an aircraft, by integrating in a suitable way numerical solutions and analytical solutions for some flight phases, in a fast and computationally effective way. The present invention further concerns an ATM system implementing the method of the invention.

2 Description of Related Art

ATM systems are currently supporting flights. However, the relevant international traffic is increasing rapidly [4,5] and the need is felt for an ATM systems that support a number of flights that is much larger than the one of current operative systems.

Therefore, the automation level in ATM processes must be increased to fulfill this requirement. The number of aircrafts that are planned to fly in the next generation airspace would require a non realistic number of human controllers [6]. As a consequence, software controllers would replace human ones in the main function such as conflict resolution.

Several tools are under development to support the implementation of safe software controllers. Indeed, some functions require running complex algorithms with a heavy computational load. Moreover, since a real time solution is needed, these algorithms should be adequate to ensure the output of a solution in a short time. In particular, uncontrolled loops must be avoided, since they prevent the system to fulfill the requirement for time determinism.

An important class of tools that are needed for future airspace management are conflict resolution systems [4,5]. They need to be supported by accurate trajectory prediction algorithms to generate realistic solutions for detected in-flight congestions. In the last few years, several tools have been developed to provide effective trajectory prediction [7-11]. The main issues related to the realization of a proper trajectory prediction tool are:

i. The tool must be capable to support real-time conflict resolution, i.e. thousands of runs must be performed in few seconds;

ii. The tool must be based on the knowledge of parameters included in an aircraft database that covers all managed traffic and that is updated as soon as a non negligible number of new aircraft models is introduced in the market.

To ensure that condition i) is satisfied, the trajectory prediction computational engine must be reduced so that it performs the minimum number of needed computations to generate a solution.

Regarding condition ii), the worldwide standard database that was selected as reference in most of the ATM tools that have been developed in the last few years is BADA™ developed by Boeing™ Europe for EUROCONTROL™. The version 3.6 included all parameters needed to integrate aircraft altitude and speeds with the 99% coverage of all aircraft operating in Europe up to year 2006, and the majority of aircraft types operating across the rest of the World [11].

The following journal articles are related to the same field of automation of ATM systems:

Slattery, R. and Zhao, Y., "Trajectory Synthesis for Air Traffic Automation," AIAA Journal of Guidance, Control, and Dynamics, Vol. 20, Issue 2, March-April 1997, pages 232-238;

Swenson, H. N., Hoang, T., Engelland, S., Vincent, D., Sanders, T., Sanford, B., Heere, K., "Design and Operational Evaluation of the Traffic Management Advisor at the Fort Worth Air Route Traffic Control Center," 1st USA/Europe Air Traffic Management Research and Development Seminar, Saclay, France, June 1997;

Glover, W. and Lygeros, J., "A Stochastic Hybrid model for Air Traffic Control Simulation" in Hybrid Systems: Computation and Control, ser. LNCS, R. Alur and G. Pappas, Eds., Springer Verlag, 2004, pages 372-386;

Marco Porretta, Marie-Dominique Dupuy, Wolfgang Schuster, Arnab Majumdar and Washington Ochieng, "Performance Evaluation of a Novel 4D Trajectory Prediction Model for Civil Aircraft", The Journal of Navigation, Vol. 61, 2008, pages 393-420.

It is worth noting that none of the above articles reports about a real-time implementation of trajectory prediction for the automation of the current form of Air Traffic Management System.

BRIEF SUMMARY OF THE INVENTION

In one aspect, the present invention provides a vertical trajectory prediction method for Air Traffic Management that solves the problems and overcomes the difficulties of the prior art.

It is specific aspect of the present invention a system for Air Traffic Management that implements the method object of the invention.

It is subject-matter of the present invention a method for the prediction of aircrafts vertical trajectory, in particular for Air Traffic Management, comprising the following flight calculation modules: Take-off; Climb; Cruise; Descent; and Landing, corresponding to the relevant flight phases, wherein:

the calculation of the predicted aircraft trajectory is effected using a computer by applying the following total energy model (TEM) equations:

$$VRCD = \frac{(T-D)}{mg} TAS \; ESF\{M\}$$

$$m\frac{dTAS}{dt} = (T-D) - mg\frac{VRCD}{TAS} = (T-D)(1 - ESF\{M\})$$

$$\dot{m} = -f$$

$$\frac{dh}{dt} = TAS \sin\gamma$$

solving for VRCD, TAS, and m; where VRCD is the vertical rate of climb or descent; TAS is the true air speed, ESF is the energy share factor, T is the thrust and D the drag, m the mass of the aircraft modeled as point-mass, {M} is the Mach number depending on TAS and temperature and altitude, g is the gravity acceleration, and f is the fuel flow, and γ is the flight path angle;

the calculation of the predicted aircraft trajectory for Cruise phase, wherein only the mass is a variable, is performed by using the following analytical solution to said TEM equations:

$$t - t_0 = \frac{dist}{TAS} = \sqrt{\frac{1}{k_9 \cdot k_{10}}} \cdot \left[\tan^{-1}\left(\sqrt{\frac{k_{10}}{k_9}} \cdot m_{fin}\right) - \tan^{-1}\left(\sqrt{\frac{k_{10}}{k_9}} \cdot m_{in}\right)\right]$$

solved for the mass $m_{fin}$ at the end of the cruise phase as a function of the initial mass $m_{in}$, and wherein t is the elapsed flight time, $k_9$ and $k_{10}$ are constant terms pre-defined according to the individual aircraft.

Preferably according to the invention, for the Take-off phase, which is divided into ground roll, transition and initial climb phases, the calculation of the predicted aircraft trajectory is performed by using the following analytical solutions to said TEM equations:

$$t_{TR} = t_{LO} + \frac{R_{TR}}{V_{LO}} \gamma_{TR}; \; x(t_{TR}) = x_{TR};$$

$$h(t_{TR}) = h_{TR}; \; V(t_{TR}) = V_{LO} = 1.2 \cdot (V_{stall})_{TO}$$

$$\frac{dx}{dt} = V \sqrt{1 - \frac{(T-D)^2}{W^2} ESF^2 \cdot C_{pow,red}^2}$$

that are solved by the ground travelled distance x, wherein $t_{TR}$ is the transition phase time, $t_{LO}$ is the exact time of lift-off, $x_{TR}$, the travelled distance at $t_{TR}$, $\gamma_{TR}$ the travelled angle during transition, $V_{LO}$ the lift-off TAS, h is the altitude, $h_{TR}$ the altitude at $t_{TR}$, V is the current TAS, $(V_{stall})_{TO}$ is the stall speed of the aircraft with gear down, W is the aircraft weight, $C_{pow,red}$ is the pre-defined coefficient of power reduction.

Preferably according to the invention, for the Landing phase, the calculation of the predicted aircraft trajectory is effected by using the following $$V_C = \frac{(h - h_o)V_{CA,screen} + (h_{screen} - h)V_{Co}}{h_{screen} - h_o}$$

for the glide approach, and $$\frac{dh}{dt} = V_{flare} \sin\gamma$$

for the flare, wherein h is the altitude, $h_o$ is the altitude for the beginning of glide approach, $h_{screen}$ is the decision altitude, $V_{CA,screen}$ is the calculated air speed (CAS) speed to be reached at $h_{screen}$, $V_{C0}$ is the CAS speed at $h_o$, $V_C$ the CAS speed at h; $V_{flare}$ the CAS speed during flare and gamma is the slope of the vertical trajectory during flare.

Preferably according to the invention, the TEM equations are solved:
  each time a flight plan is needed or changed, in particular before the take-off phase of the aircraft,
  each time, within a fixed flight plan, the difference between the actual position of the aircraft, given by a radar detection, and the predicted position is larger than a pre-defined threshold.

Preferably according to the invention, the integration of the TEM equations for the calculation of predicted trajectory is made by using a pair of maximum integration pitches for speed and height, in order to address the minimum computational load at an acceptable accuracy level, the maximum integration pitches pair being determined by performing the following steps:

Performing simulations, according to said TEM equations, of climb, descent, and cruise phases for uniformly distributed set of pairs of speed and height pitches ranging from a minimum values pair to a maximum values pair:
  Assuming the minimum values pair as the most accurate values pair;
  For each simulation, comprising climb, descent, and cruise phases, carrying out contour plots reporting the percent RMS error of each pair of speed and height pitches with respect to said minimum values pair;
Choosing the optimal pitches pair as the pair representing the point that has an error of less than a pre-defined threshold value and it is also the most distant from said minimum values pair.

Preferably according to the invention, for all the flight phases except Cruise, the TEM equations are integrated and, for any i-th, i being a positive integer number, integration step:
  one checks that the calculated performance status is within a pre-defined target PS, comprised of a target CAS and target altitude h, calculated on the basis of a pre-defined flight envelope;
  if the calculated performance status is outside the flight envelope, performing the following steps:
  substituting said calculated performance status with a corrected performance status that is nearest to the boundaries of the flight envelope and to which a safe margin distance from these boundaries is added, in order to avoid that in the subsequent calculation it goes outside the flight envelope;
  proceeding to the i+1-th step of integration starting with the corrected performance status, i.e. corrected CAS and altitude h.

Preferably according to the invention, the effect of the wind is taken into account by adding the following equations to said TEM equations:

$$GS_{Long} = WS_{Long} + \sqrt[2]{TAS^2 - WS_{Lat}^2 - VRCD^2}$$

$$\psi = \beta - \arctg\left(\frac{-WS_{Lat}}{TAS_{Long}}\right)$$

$$= \beta - \arctg\left(\frac{-WS_{Lat}}{GS_{Long} - WS_{Long}}\right) =$$

$$= \beta - \arctg\left(\frac{-WS_{Lat}}{\sqrt[2]{TAS^2 - WS_{Lat}^2 - VRCD^2}}\right)$$

and solving for $GS_{Long}$, that is the horizontal component of the aircraft ground speed, and for $\psi$ that is the heading angle, wherein $WS_{Long}$ is the horizontal wind speed, $WS_{Lat}$ is the lateral component of wind speed, beta is the course angle.

The results obtained by solving said equations may be displayed graphically.

The present invention further provides a system for Air Traffic Management, comprises a electronic elaboration unit for the calculation of the predicted trajectory and a controller of the flight providing to said electronic elaboration unit natural language commands for the trajectory the aircraft has to follow, characterised in that said electronic elaboration unit executes a translation of the natural language commands into input numerical values, and in that said electronic elaboration executes the calculation of the method that is subject-matter of the present invention.

An additional aspect of the present invention is an electronic elaboration unit, which comprises code means that execute, when run, the method that is subject-matter of the present invention.

The present invention also provides a computer program, which comprises code means suitable to execute, when they run on a elaboration electronic unit, the calculation according to the method that is subject-matter of the present invention.

It is specific subject-matter of the present invention a memory medium, readable by a computer, storing a program, characterised in that the program is the computer program that is subject-matter of the present invention.

It is specific subject-matter of the present invention a method according to the subject-matter of the invention wherein the results of the solutions of said equations are displayed graphically. It is specific subject-matter of the present invention a method according to the subject-matter of the invention wherein the results obtained are employed in air traffic control.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE INVENTION

The tool according to the invention was developed in the mainframe of SESAR project funded by the European Union [5].

The method according to the invention will be also called in the following "Vertical Trajectory Prediction Algorithm" (VTPA). It was developed in order to predict the altitude profile of the trajectory of an aircraft during a typical mission, in the framework of an enhanced-Flight Data Processing (e-FDP) system, i.e. an integrated tool for supporting the activities of main Air Traffic Management (ATM) European control centers. The above mentioned altimetry profile could be combined with geodetic trajectory profile in order to allow for full trajectory prediction.

The main purpose for the realization of the algorithm is to generate a realistic vertical trajectory profile for each operating mode that is commanded by Air Traffic Controllers. The list of all implemented operating modes is reported in the following section.

The vertical trajectory profile was defined by means of a time series of a collection of data that was called performance status (PS). This type of information was determined by estimating the following terms for each instant in the time sequence:
1. Aircraft Mass (m) [tons];
2. Estimated Time Over (ETO or t) [$10^{-7}$s];
3. Estimated Level Over (ELO or h) [feet];
4. True Air Speed (TAS) [knots];
5. Ground Speed (GS) [knots];
6. Vertical Rate of Climb or Descent (VRCD or ROCD) [feet/s];
7. Travelled distance $d_{travel}$ [NMi];
8. Ground Temperature (GT) [° C.];
9. Normal acceleration [g];
10. Longitudinal acceleration [g];
11. Aircraft heading $\psi$ (°).

Moreover, a solution had to be produced for each type of maneuver that could be commended by Air Traffic Controllers during a flight. Some project constraints were assigned to the system so that it would be adequate for real-time operation of conflict resolution routines. It must be capable to accurately track the performance status of aircrafts during all typical transport aircraft flight phases such as takeoff, climb, cruise, descent, and landing. The aircraft dynamics was determined by using the Total Energy Model (TEM) that turned out as an efficient point-mass model [1]. Aircraft configuration parameters included in the database named Base of Aircraft Data™ (BADA) v.3.1[1]. This database was realized by EUROCONTROL™.

Figure 1:
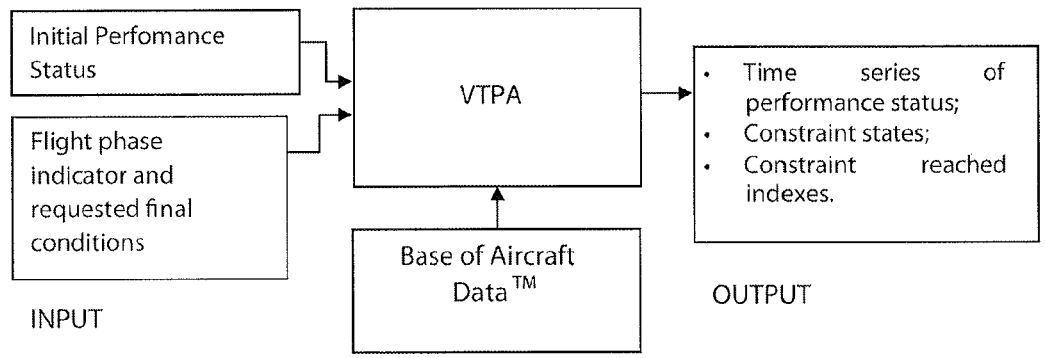
FIG. 1 shows a general flow chart of the method according to the invention.

FIG. 1 reports the main flow-chart of VTPA algorithm.
Main Algorithm Features
Operating Modes Several operating modes are provided for the VTPA algorithm, such as:
1. Take Off mode. This mode generates a PS time series for a take-off of an aircraft;
2. Landing mode. This mode generates a PS time series for a landing of an aircraft;
3. Reach a speed mode. This mode generates a PS time series for a speed and level switch flight segment of an aircraft;
4. Reach a level mode. This mode generates a PS time series for a level switch flight segment of an aircraft;

5. Keep a state mode. This mode generates a PS time series for a steady cruise flight segment.
6. Performance Status Reassignment mode. This mode reassigns the final PS as specified in modes 3 and 4 if, downstream of numerical integration, one determines a PS outside the actual flight envelope.
7. Performance status and performance margins modes. These two modes computes the speed and altitude margins of the actual performance status with respect to the actual flight envelope.

Input Parameters

Initial Performance Status that is composed by the following terms:
1. Initial mass;
2. Initial ETO;
3. Initial ELO;
4. Initial TAS;
5. Initial Ground Speed;
6. Initial VRCD;
7. Initial travelled distance;
8. Initial Ground Temperature;
9. Initial normal acceleration;
10. Initial longitudinal acceleration;
11. Initial heading.

Depending on the operating mode, the following terms may be also input:
1. Level to reach—$h_{target}$ [feet], i.e. the level that must be reached at the end of the mission segment (modes 1-4);
2. TAS to reach—$TAS_{target}$ [knots], i.e. the TAS that must be reached at the end of the mission segment (mode 3);
3. Distance to reach—$d_{target}$. This distance is used for KeepAState, i.e. cruise, mode. $d_{target}$ is the distance covered during the cruise flight segment (mode 5);
4. Maximum distance to reach a level $d_{lev}$ [NMi], i.e. the maximum distance that can be travelled before reaching a level (modes 1-4);
5. Maximum distance to reach a TAS $d_{TAS}$ [NMi], i.e. the maximum distance that can be travelled before reaching a stated value of TAS (mode 3);
6. Performance modulation. This is a flag. If it is true, then minimum, mean, and maximum thrust configuration shall be performed in order to reach the constraints. If it is false, only minimum thrust configuration must be performed (modes 1, 3, 4);
7. Aircraft position. It is a data set that contains information about local values of environmental conditions, i.e. sea level temperature and wind, for given values of travelled distance (all modes).

Output Parameters
1. Time series of Performance Status;
2. Constraint states for final Level and/or TAS:
   a. Minimum—if the final value is reached with economic thrust/ESF combination;
   b. Mean—if the final value is reached with nominal thrust/ESF combination;
   c. Maximum—if the final value is reached with maximum thrust/ESF combination.
3. Constraint reached indexes, i.e. the array indexes in the PS array where final level/TAS are reached.

External Data

The external data used as aircraft data are taken from database BADA™ that is provided by EUROCONTROL™. It contains both global aircraft information, such as maximum accepted longitudinal acceleration, and single aircraft parameters values, such as wing span. As prior art feature, it is constantly updated to contain parameters of all currently flying aircrafts.

Requirements

This section describes the initial requirements for the method or "tool" according to the invention. The underlying logic for requirement definition was driven by a series of issues, such as:
i. Tool routines must be capable to support real-time operation of an ATM management system;
ii. The tool must make use of widely used databases of aircraft performances so that it could be easily updated when new aircrafts were introduced in the airspace;
iii. The tool must be able to estimate the aircraft performance status for all typical flight phases with adequate accuracy on all terms;
iv. The tool must be able to determine up to three solutions for each call of Reach a Speed, Reach a Level, and Takeoff modes. These solution are tagged as Minimum, Mean, and Maximum and they must be relevant to three different levels for the values of Thrust and Energy Share Factor (ESF). This latter is defined as the ratio between the energy devoted to climb/descent to the energy needed to keep the level.

TEM Software Architecture

The purpose of the tool according to the invention was to determine the aircraft a time series of performance statuses relevant to a trajectory vertical profile of an aircraft. This calculated time series can be determined once an initial state and a specific thrust profile was assigned. As reported in the previous section, the main dynamics model selected was TEM[10] that was a point-mass aircraft model represented by the following set of equations:

$$VRCD = \frac{(T-D)}{mg} TAS \, ESF\{M\}$$

$$m\frac{dTAS}{dt} = (T-D) - mg\frac{VRCD}{TAS} = (T-D)(1 - ESF\{M\})$$

$$\dot{m} = -f$$

$$\frac{dh}{dt} = TAS \sin\gamma$$

Solved for VRCD, TAS, m; VRCD is the vertical rate of climb or descent; TAS is the true air speed, ESF is the energy share factor, T is the thrust and D the drag, m the mass of the aircraft modeled as point-mass, $\{M\}$ is the Mach number that can be calculated as a function of the TAS and temperature, g is the gravity acceleration, f is the fuel flow and γ is the flight path angle.

The term ESF is the energy share factor accounting for aircraft attitude in the airspeed axis reference frame that can be expressed as a function of Mach number $\{M\}$ [1].

TEM routines are organized according to the invention in a software architecture that is composed by three types of routines such as:
1. Routines for pre-processing of aircraft database;
2. Runtime trajectory prediction routines;
3. Routines for testing results.

Since BADA database [1] is compiled in ASCII text format, the first type of routines have been developed in order to make its data available for runtime routines. Moreover, all data that is constant for runtime routines and that can be derived from BADA database or from other references was initialized using these routines.

The achievement of the assigned trajectory prediction requirements is carried out by the second type of routines. A main routine implements the general form of the algorithm that supports trajectory prediction services. A series of subroutines realize specialized tasks, such as:
1. Initialization of parameters;
2. Check of flight envelope constraint violation;
3. Realization of trajectory prediction steps, i.e. determination of aerodynamics drag and thrust.

Finally, a routine for chain testing algorithm performances was developed by the invention. Chain testing was needed for the determination of accuracy and to avoid performance regression during debugging.

Preprocessing Routines

Two main database structures have been initialized (imported in the invention method tool) to be used for the trajectory prediction algorithm:
1. A structure named "BADA" by the invention that contains all and only the data contained in the BADA™ database developed by EUROCONTROL™. It is divided into three substructures by the same EUROCONTROL™, i.e.:
   a. A substructure named "OPF" that contains all data that are relevant to a single particular aircraft. Indeed, "BADA" contains one "OPF" for any aircraft included in the database;
   b. A substructure named "APF" that contains all data that are relevant to airline procedures for a single aircraft;
   c. A substructure named "GPF" that contains all constant parameters that are common to all aircrafts.
2. A structure named "TEM" that contains all the data that can be derived from the BADA™ database but that are constant for the trajectory prediction algorithm. It can be divided into three substructures, such as:
   a. A substructure named "conversions" that contains all conversions factors among the different measurement units adopted in the trajectory prediction algorithm;
   b. A substructure named "Global" that contains global parameters, such as the maximum allowed TAS in mid-air flight;
   c. A substructure named "Aircraft" that contains parameters specific to each aircraft.

Runtime Trajectory Prediction Routines

Figure 2:
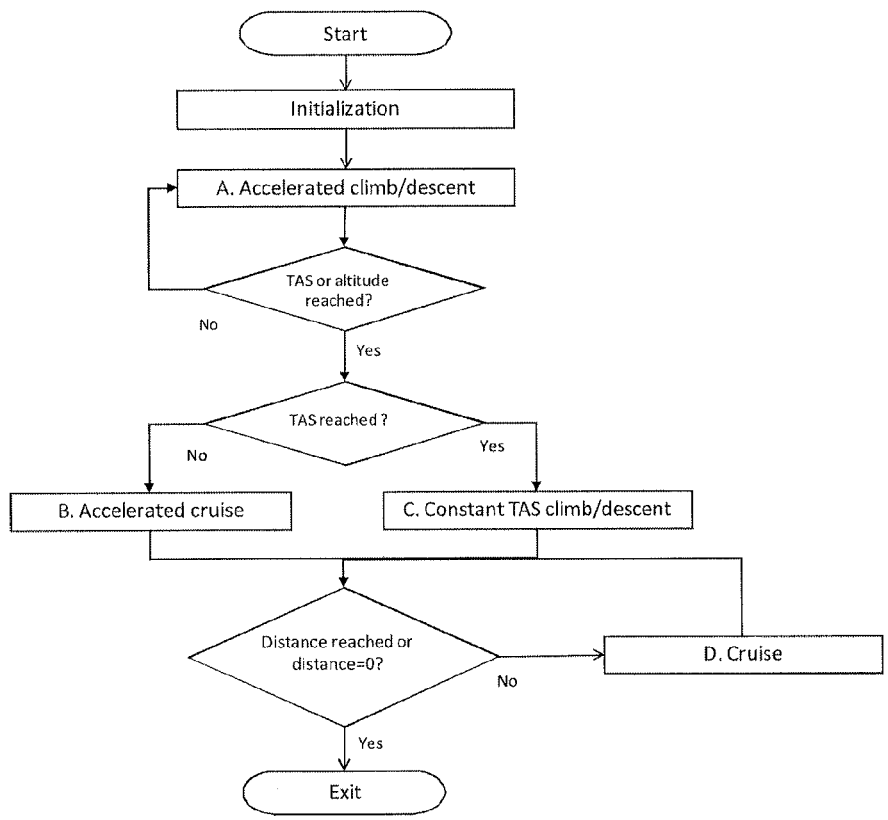
FIG. 2 shows a flow chart of the routine "computetem" in the method according to the invention.

This section reports flow-charts for all components of VTPA routines. Routine names are highlighted in red in figures. The main routine that performs general form of trajectory prediction routines is called "computeTEM". It is organized following the scheme reported in FIG. 2. The general algorithm is capable to estimate all the terms required for VTPA as above described, such as:
1. Determination of final and partial Performance Status for accelerated climb/descent (Reach a Speed mode);
2. Determination of final and partial Performance Status for accelerated cruise (Reach a Speed mode);
3. Determination of final and partial Performance Status for constant TAS climb/descent (Reach a Level mode);
4. Determination of final ad partial Performance Status for constant TAS cruise (Keep a State mode);
5. Determination of final ad partial Performance Status for Take Off (Take Off mode);
6. Determination of final ad partial Performance Status for Landing (Landing mode).

Mode 5 and 6 are needed since the BADA data base does not contain parameters to allow for dynamics integration during take-off and landing. For this reason, a pure kinematic model is adopted to carry out PS estimates when the aircraft level is below 3000 ft with respect to departure/landing runway. This model will be described in the following.

Initialization

The initialization block has two main purposes:
1. The initialization of parameters used for the integration;
2. Performing a check in input values consistency.

Figure 3:
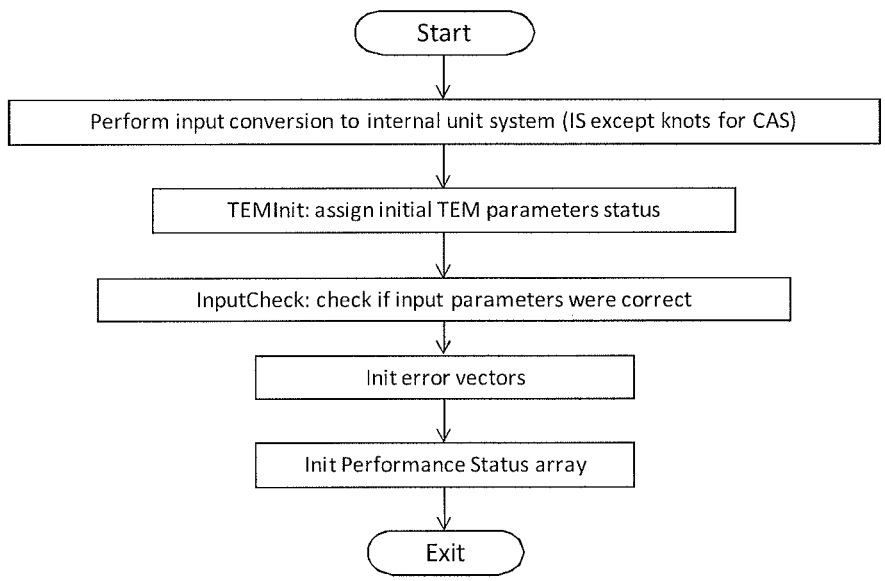
FIG. 3 shows a flow-chart for initialisation step in the method according to the invention.

The relevant flow-chart is reported in FIG. 3.

Description of TEM Init Block

This block perform the initialization of integration parameters such as mass, TAS, ELO, ETO, $d_{travel}$, and VRCD. They are set equal to the input PS unless initial or final TAS is set to 0 (takeoff or landing conditions). In these latter cases, initial and final TAS are set equal to minimum TAS during takeoff or landing, that is derived by BADA™. When this correction is performed, also the initial/final altitude is set to 3000 ft above runway level, i.e. the altitude where takeoff and landing end.

Description of InputCheck Block

The InputCheck routine performs the checks reported in table 1 in order to verify the correctness of input parameters. The call generates an exception if a single check fails.

Maximum and minimum TAS is determined considering maximum and minimum Calibrated Air Speed (CAS) and Mach reported in BADA by means of the following procedure:
1. Given current temperature at sea level, current local temperature, pressure, density, and speed of sound are computed following the ISA atmospheric model [1];
2. Mach and CAS constraints are transformed into TAS constraints;
3. Initial condition are verified on initial mass values;
4. Final max TAS and ELO are verified for initial mass values;
5. Final minimum TAS is verified for minimum operative mass, i.e. the mass that determines the minimum constraint.

TABLE 1

| No. | Name | Type | Unit | Admitted values | Description |
|---|---|---|---|---|---|
| 1. | ELO final | double | feet | Min: −300<br>Max: Max height with minimum mass | Final height |
| 2. | TAS final | double | knots | Min: 0<br>Max: Max TAS with minimum mass | Final TAS |
| 3. | $d_{travel}$ final | double | NMi | Min: 0<br>Max: Unlimited | Final distance for cruise flight |
| 4. | PS initial | structure | | | Initial Performance Status |
| 5. | .ELO | double | feet | Min: −300<br>Max: Max height with initial mass | Initial height |
| 6. | .ETO | double | S | Min: 0<br>Max: Unlimited | Starting time |

TABLE 1-continued

| No. | Name | Type | Unit | Admitted values | Description |
|---|---|---|---|---|---|
| 7. | .TAS | double | knots | Min: 0<br>Max: Max TAS with initial mass | Initial TAS |
| 8. | .mass | double | tons | Min: Minimum operative mass<br>Max: Maximum operative mass | Initial mass |
| 9. | .speedRate | double | knots/s | No limit | Initial speed rate. It has no influence on TEM |
| 10. | .VRCD | double | feet/s | No limit | Initial ROCD. It has no influence on TEM |

Summary of Input and Output Terms for Initialization
Input Terms:
1. Initial PS;
2. Level to reach—$h_{target}$ [feet], i.e. the level that must be reached at the end of the mission segment (modes 1-4);
3. TAS to reach—$TAS_{target}$ [knots], i.e. the TAS that must be reached at the end of the mission segment (mode 3);
4. Distance to reach—$d_{target}$. This distance is used for Keep-AState, i.e. cruise, mode. $d_{target}$ is the distance (mode 5);
5. Maximum distance to reach a level $d_{lev}$ [NMi], i.e. the maximum distance that can be travelled before reaching a level (modes 1-4);
6. Maximum distance to reach a TAS $d_{TAS}$ [NMi], i.e. the maximum distance that can be travelled before reaching a stated value of TAS (mode 3).

Output Terms

The output terms are the same input terms after the following actions are performed:
1. Initial and/or final TAS and/or altitude are corrected if initial/final TAS is equal to 0, i.e. the TAS is set at a minimum value that is sufficient for altitude keeping;
2. All parameters are verified to stay within reasonable flight constraints.

Accelerated Climb/Descent

The "Accelerated climb/descent" block performs performance status integration in the condition where the most general type of trajectory must be commanded. As it is known, in this phase two terms must be changed at same time, i.e.:
1. The TAS must be incremented/decremented by performing a speed switch;
2. The altitude level must be changed by performing a level change.

Three main procedures must be accomplished by following the method reported in [1] in order to determine the current values of the dynamics terms for the integration of Equation 3.1, such as:
3. Check for Flight Envelope constraints;
4. Determination of drag D;
5. Determination of thrust T and ESF.

Figure 4:
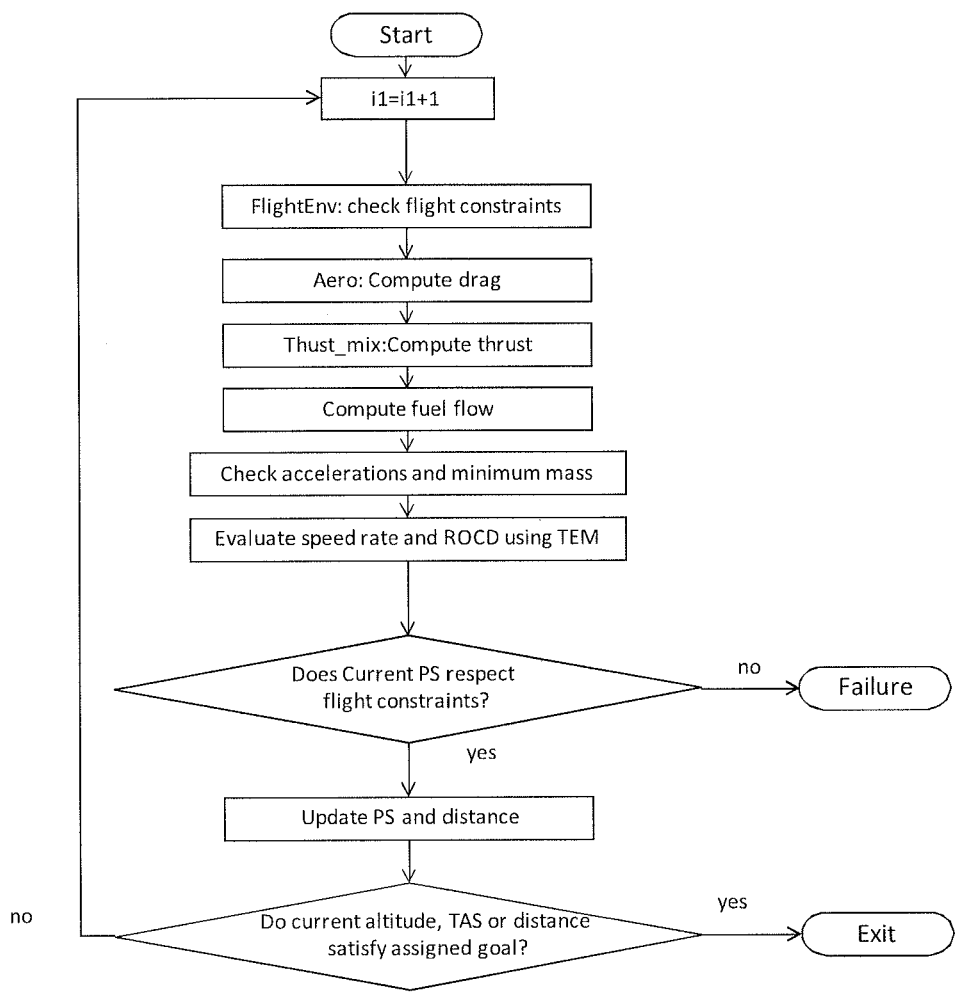
FIG. 4 shows a flow-chart for the method according to the invention applied to accelerated climb/descent phase.

The above mentioned procedure are common to all phases reported in the following sections. The flow chart of the algorithm in this phase is reported in FIG. 4.

Description of Flight Env Block

All PS parameters are verified to be consistent with flight constraint as described farther in the following.

Description of Aero Block

According to the prior art, the aerodynamic drag D is computed by means of the following procedure:

1. Given current temperature at sea level, current local density ρ is computed following the ISA atmospheric model [1];
2. The lift coefficient $C_L$ is computed considering equilibrium condition (lift equals aircraft weight–L=W). It results:

$$C_L = \frac{2mg}{\rho V_{TAS}^2 S} \tag{3.2}$$

where:
m is current aircraft mass;
g is gravitational acceleration (9.81 m/s²);
$V_{TAS}$ is current TAS;
S is aircraft wing surface that is reported in BADA.
3. The drag coefficient $C_D$ can be computed as:

$$C_D = C_{Do} + C_{DL} C_L^2 \tag{3.3}$$

where:
$C_{Do}$ is the aircraft parasitic drag coefficient that is reported in BADA;
$C_{DL}$ is the aircraft induced drag coefficient that is reported in BADA.
4. D is given as:

$$D = 0.5 \rho V_{TAS}^2 S\, C_D \tag{3.4}$$

Description of Thrust Mix Block

Thrust and ESF are computed depending on the selected Performance Modulation following the procedure reported farther in the following.

Summary of Input and Output Terms for Initialization
Input Terms:
1. Initial PS;
2. Level to reach—$h_{target}$ [feet], i.e. the level that must be reached at the end of the mission segment (modes 1-4);
3. TAS to reach—$TAS_{target}$ [knots], i.e. the TAS that must be reached at the end of the mission segment;
4. Maximum distance to reach a level $d_{lev}$ [NMi], i.e. the maximum distance that can be travelled before reaching a level;
5. Maximum distance to reach a TAS $d_{TAS}$ [NMi], i.e. the maximum distance that can be travelled before reaching a stated value of TAS.

Output terms
1. Time series of Performance Status;
2. Constraint states for final Level and/or TAS:
   a. Minimum—if the final value is reached with economic thrust/ESF combination;
   b. Mean—if the final value is reached with nominal thrust/ESF combination;
   c. Maximum—if the final value is reached with maximum thrust/ESF combination;

3. Constraint reached indexes, i.e. the indexes in the PS array where final level/TAS are reached.

Accelerated Cruise

Figure 5:
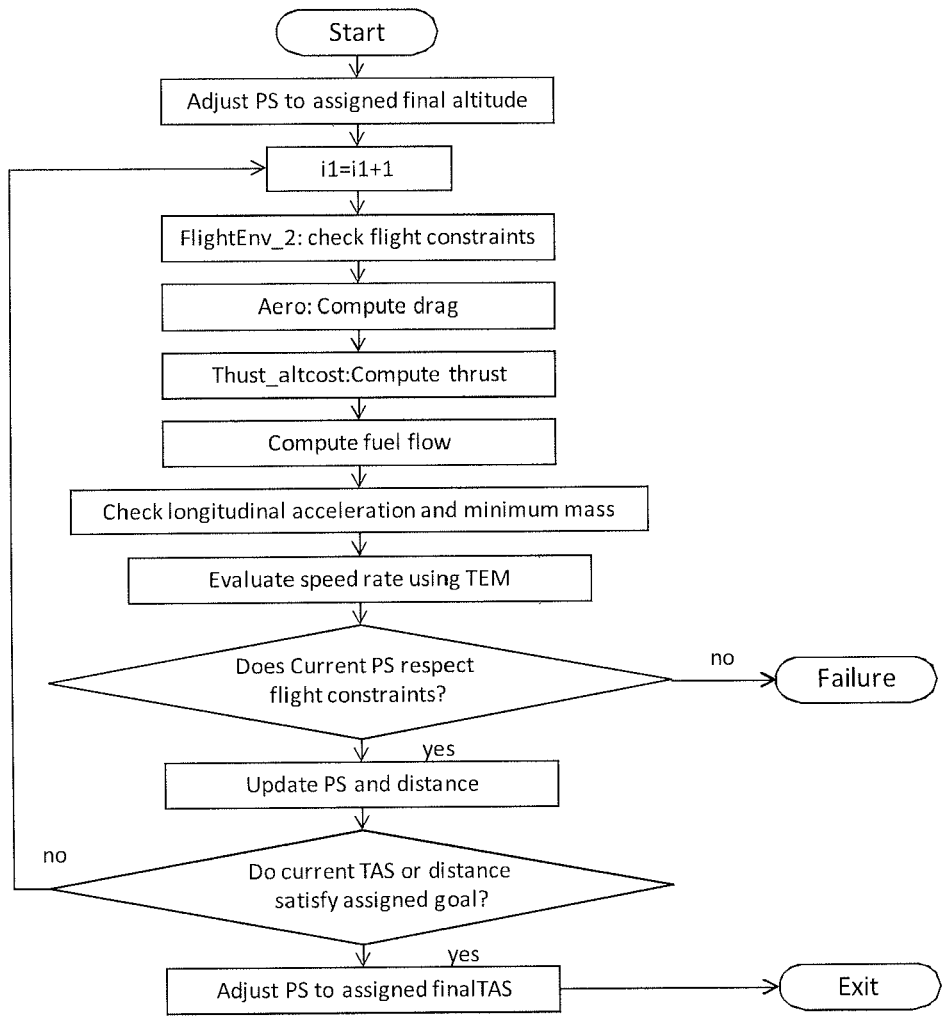
FIG. 5 shows a flow-chart for the method according to the invention applied to accelerated cruise phase.

In this case, the flight is level (i.e. at constant altitude) but a positive or negative speed switch must be realized. As a consequence, only the speed rate must be determined and VRCD is equal to zero. FIG. 5 reports the flow-chart of the algorithm for this phase.

Description of Flight Env2 Block

All PS parameters are verified to be consistent with flight constraint as described above. In this case the algorithm computational footprint is optimized considering that, being the altitude constant, also all the other parameters which depend exclusively on the altitude are constant.

Description of Aero Block

The aerodynamic drag D is computed as above reported.

Description of Thrust Mix Block

Thrust is computed depending on the selected Performance Modulation following the procedure reported farther in the following.

Summary of Input and Output Terms for Initialization

Input Terms:
1. Initial PS;
2. TAS to reach—$TAS_{target}$ [knots], i.e. the TAS that must be reached at the end of the mission segment;
3. Maximum distance to reach a TAS $d_{TAS}$ [NMi], i.e. the maximum distance that can be travelled before reaching a stated value of TAS.

Output Terms
1. Time series of Performance Status;
2. Constraint states for final TAS:
   a. Minimum—if the final value is reached with economic thrust level;
   b. Mean—if the final value is reached with nominal thrust level;
   c. Maximum—if the final value is reached with maximum thrust level;
3. Constraint reached indexes, i.e. the indexes in the PS array where final TAS is reached.

Constant TAS Climb/Descent

Figure 6:
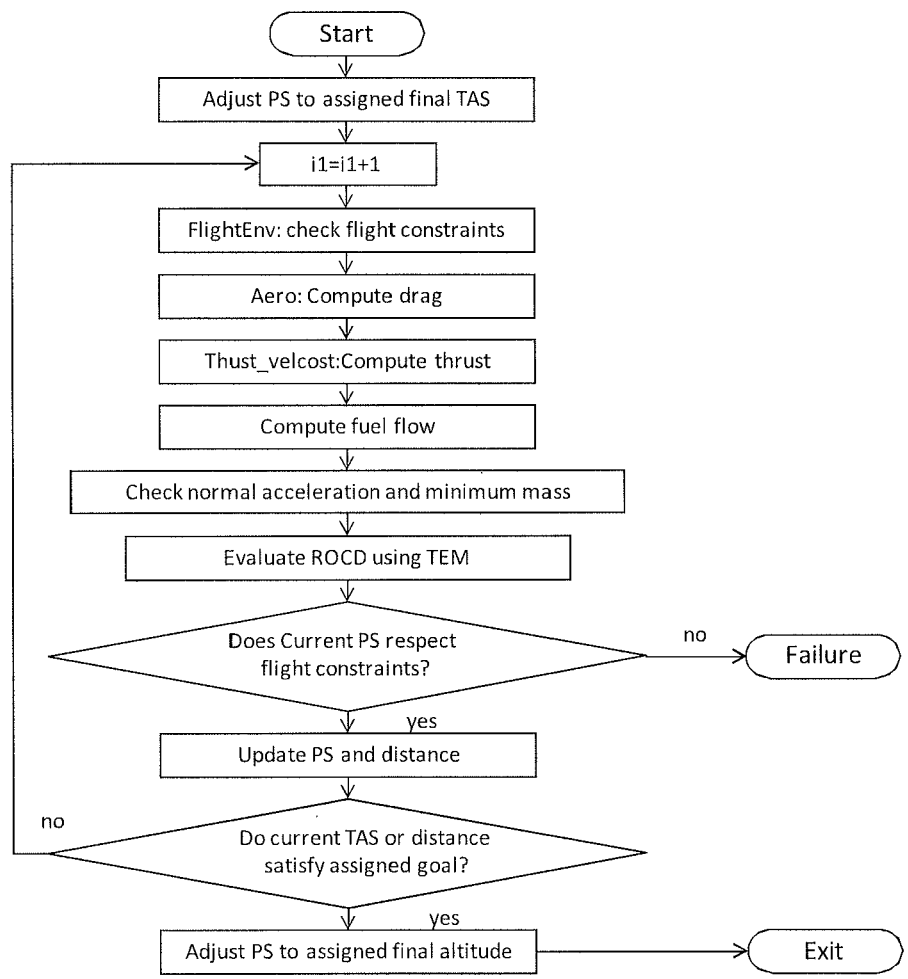
FIG. 6 shows a flow-chart for the method according to the invention applied to changes of level performed at constant tas.

This is the case when a level change must be performed without a speed switch. In this case the integration is performed in order to determine the ROCD. FIG. 6 represents the relevant flow-chart.

Description of Flight Env block

All PS parameters are verified to be consistent with flight constraint as described above.

Description of Aero Block

The aerodynamic drag D is computed as reported above.

Description of Thrust Velcost Block

In this case Trust T equals Aerodynamic Drag D (D=T). The resulting T is verified to be less than $T_{MAX}$.

Summary of Input and Output Terms for Initialization

Input terms:
1. Initial PS;
2. Level to reach—$h_{target}$ [feet], i.e. the level that must be reached at the end of the mission segment;
3. Maximum distance to reach a level $d_{lev}$ [NMi], i.e. the maximum distance that can be travelled before reaching a level.

Output Terms
1. Time series of Performance Status;
2. Constraint states for final Level:
   a. Minimum—if the final value is reached with economic thrust/ESF combination;
   b. Mean—if the final value is reached with nominal thrust/ESF combination;
   c. Maximum—if the final value is reached with maximum thrust/ESF combination;
3. Constraint reached indexes, i.e. the indexes in the PS array where final level is reached.

Constant TAS Cruise

When the aircraft is commanded to perform a constant TAS cruise for a given distance only the current mass must be updated. For the presented application an original analytical solution was developed that allows to determine the mass change between two cruise segments in a single step. This solution is documented farther in the following.

Takeoff and Landing

Figure 8:
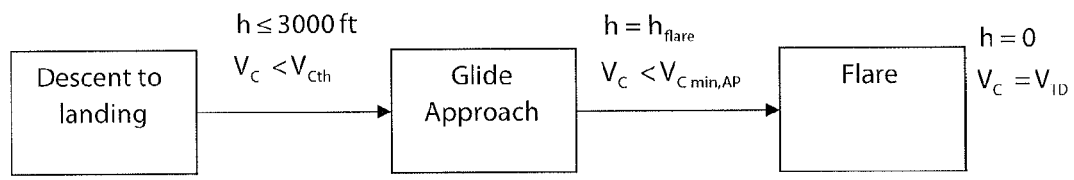
FIG. 8 shows a landing simulation logic according to the known art and standards.

According to FIG. 8, a typical landing phase consists of the following sequences:

Glide approach to the runway, during which the glide path angle, γ, is held constant. In addition, this angle is kept as small as possible (usually between 2.5° and 3°) so to minimize the rate of sink, thus reducing the energy to be dissipated at the impact with the ground;

Flare to touchdown, during which the speed vector is rotated so to reach a level flight condition at the runway level and further minimize the rate of sink;

Ground roll, during which spoilers, brakes, eventually thrust reverse is applied to bring the airplane to the exit speed from the runway.

With reference to the BADA model [1], the initial conditions for landing are specified in terms of both altitude and Calibrated Air Speed (CAS) as follows (see FIG. 8):

$$h_0 \leq 3000 \text{ ft}$$

$$V_{C0} \leq V_{Cth} = V_{Cmin,AP} + 10 \text{ kt}$$

$$V_{Cmin,AP} = 1.3 V_{st,AP}$$

These conditions are the ones computed with the BADA model as the terminal conditions of a descent to 3000 ft [1]. At this point, the simulation of the glide approach phase of the landing process is realized by defining a scheduled CAS sequence to bring the airplane at the screen or obstacle height ($h_{obs}$ in the figure) with the correct CAS, as required by Federal Aviation Regulations:

$$V_C \geq V_{Cmin,AP}$$

Specifically, the minimum required approach CAS is set at the obstacle height. For the glide approach simulation the Trajectory Energy Model [1] is used. The glide approach ends when the altitude for flare starting is reached. The flare altitude is computed within the flare model and it depends on the incremental lift used to curve the flight path, which in turns depends on the piloting technique.

The terminal conditions of the glide approach are the initial conditions for the simulation of the flare maneuver which brings the airplane to have the speed vector parallel to the runway. The flare is reproduced by adopting a model proposed in [3], which is based on flight data.

For this analysis the ground roll phase is not of interest. The following block diagram summarizes the landing simulation logic.

Take-Off Model Logic

Figure 9:
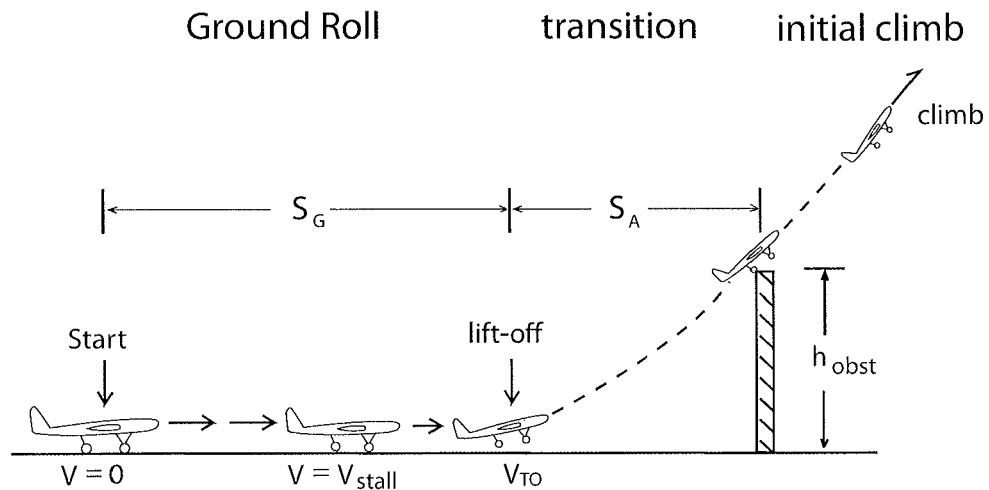
FIG. 9 shows a schematic representation of the takeoff phase (based on [2])

Following the same approach of the landing, the overall takeoff process can be broke down in three phases (see FIG. 9):

Ground Roll, during which the airplane is accelerated until the liftoff speed is reached;

Transition to Climb, during which the flight path angle varies gradually from zero (at liftoff) to a constant value for climb;

Initial Climb, during which the airplane follows the takeoff flight path until a safe height above the terrain is reached and climb to-cruise altitude is started.

Figure 10:
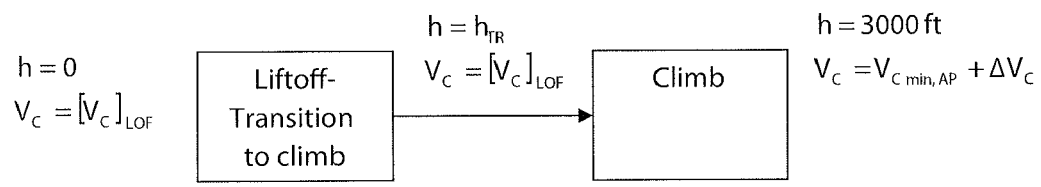
FIG. 10 shows a takeoff simulation logic according to the known art and standards.

In this analysis only the second and third phases are of interest since the simulation will be started from the liftoff condition. Thus, the initial values of the state parameters are the ones specified at the end of the ground roll phase:

$$x(t_{LO})=x_{LO}; h(t_{LO})=h_{rwy}; V(t_{LO})=V_{LO}=1.2 V_{st,TO}$$

where $h_{rwy}$ is the runway altitude above sea level. We propose to employ a different model for each of the above phases, separately described in the following. FIG. 10 summarizes the takeoff simulation logic. The simulation is started from the liftoff condition which determines the initial conditions for the transition to climb phase, during which the airplane flight path curves until the flight path angle of the initial climb condition is reached. This last one depends on the incremental lift used to curve the trajectory and on the maximum thrust amount used to climb out. To simulate this phase a model which integrates the climb model and the acceleration limits proposed in BADA with the piloting technique and the model for transition proposed in [3] has been developed. Once the terminal condition of transition is reached the climb phase is started by the scheduled. CAS sequence suggested by the BADA model. Climb is terminated when the airplane reaches 3000 ft.

Description of Technical Issue that has been Solved by the Solution According to the Invention.

The proposed method tool is intended to provide real-time trajectory prediction capabilities at average level accuracy to systems for the automation of Air Traffic Management function. These tools will provide autonomous resolution of potential future conflicts during flight. The main original issues that were not available before this tool was developed are reported in the following list:

1. Real time capability to predict in a few seconds the altimetry trajectories of all aircraft flying over an extended region under ATC control;
2. The tool supports multi-mode execution of maneuvers, when applicable. Indeed, nominal mode, maximum thrust mode, and economic mode have been implemented in the case of change of level and/or speed switch;
3. The tool is capable to check if a developing trajectory can be actually flown by the aircraft. Indeed, flight envelope constraint are verified in real-time during integration;
4. The tool includes the capability to simulate a complete mission including terminal phases, such as landing and takeoff;
5. To prevent failure in reaching a flight state or level, the tool is capable of computing in real-time the speed and altitude margins for any flight state and atmosphere condition with respect to the actual flight envelope. Estimated margins can be used to drive the trajectory prediction process;
6. In case a failure notice is generated, because an algorithm call requires speed values or final height outside the envelope, the tool outputs indications in order to address a new call to the nearest status that can be accomplished with successful compliance of the envelope limits.

In the following subsections the main original issues of the presented tool are reported.

Analytical Solution for Determining the Final Mass after a Cruise Flight Segment In order to minimize the number of computations, an original analytical solution was developed so that a precise estimate of the aircraft mass variation could be carried out after a cruise flight segment of any size. In the case of steady cruise, the single term that changes in the performance status is the mass for flight segment contained in a region with constant temperature, pressure, and wind. The solution that has been carried out allowed for avoiding any form of time consuming numerical integration. When intermediate estimate are needed the solution can be applied to segments with reduced size.

First of all, the lift coefficient $C_L$ is determined for steady cruise when lift equals aircraft weight:

$$C_L = \frac{2 \cdot m \cdot g}{\rho \cdot TAS^2 \cdot S} = k_1 \cdot m \tag{6.1}$$

Subsequently, the drag coefficient $C_D$ is derived by means of the polar equation:

$$C_D = C_{D0} + C_{DI} \cdot C^2_L = k_2 + k_3 \cdot C^2_L = k_2 + k_4 m^2 \tag{6.2}$$

Where $C_{D0}$ is the parasitic drag coefficient and $C_{DI}$ is the induced drag coefficient. These terms can be derived by BADA™ database. The constant terms k, can be easily deduced. Thus, the drag D can be determined as follows:

$$D = \frac{1}{2} \cdot \rho \cdot TAS^2 \cdot S \cdot C_D = k_5 + k_6 \cdot m^2 \tag{6.3}$$

Where $\rho$ is the local density and S is the aircraft reference wing surface (from BADA). In steady cruise thrust equals drug:

$$T = D \tag{6.4}$$

Since the time derivative of the aircraft mass in equals the opposite of the fuel flow f, i.e. a linear term of T, the following non linear differential equation can be written;

$$\dot{m} = -f = k_7 + k_8 \cdot T = k_9 k_{10} \cdot m^2 \tag{6.5}$$

Equation (6.5) can be rearranged as follows by extracting the differential terms:

$$\frac{dm}{m^2} = k_9 \cdot \frac{dt}{m^2} + k_{10} \cdot dt = \frac{k_9}{m} \cdot \frac{dm}{m^2} + k_{10} \cdot dt \tag{6.6}$$

Moreover, all terms depending on mass can be put on the left side of the equation:

$$\left(\frac{\dot{m} - k_9}{\dot{m}}\right) \cdot \frac{dm}{m^2} = k_{10} \cdot dt \tag{6.7}$$

The expression of $\dot{m}$ reported in equation (6.7) can be replaced by the one in equation (6.5):

$$\left(\frac{k_{10} \cdot m^2}{k_9 + k_{10} \cdot m^2}\right) \cdot \frac{dm}{m^2} = k_{10} \cdot dt \tag{6.8}$$

The resulting integral problem is given in the following equation:

$$\left(\frac{dm}{k_9 + k_{10} \cdot m^2}\right) = dt \qquad (6.9)$$

Equation (6.9) can be integrated in order to carry out the analytical expression of the mass at the end of the cruise segment $m_{fin}$ as a function of the initial mass $m_{in}$:

$$t - t_0 = \qquad (6.10)$$

$$\frac{dist}{TAS} = \sqrt{\frac{1}{k_9 \cdot k_{10}}} \cdot \left[\tan^{-1}\left(\sqrt{\frac{k_{10}}{k_9}} \cdot m_{fin}\right) - \tan^{-1}\left(\sqrt{\frac{k_{10}}{k_9}} \cdot m_{in}\right)\right]$$

This equation can be solved with inference on trigonometric terms and is independent from the type of engine of the aircraft.

Control by Selection of Proper Thrust and ESF Mix

The control terms in equation (3.1) are:
1. The aircraft thrust T;
2. The aircraft Energy Share Factor ESF.

In order to emulate the pilot's behavior after a command is sent from ATC, a proper arrangement of the above reported terms must be selected. The values derived by the invention to this extent are reported in table 6.1.

TABLE 6.1

| Commanded maneuver | Commanded speed switch | Commanded mode | Thrust | ESF |
|---|---|---|---|---|
| Climb | Increase | Economic | $C_{power\,red}*T_{max,\,climb}$ | Const CAS ESF (sec. 3.2 of [1]) |
| | | Average | $C_{power\,red}*T_{max,\,climb}$ | 0.3 |
| | | Max climb angle | $T_{max,\,climb}$ | 0.3 |
| | Decrease | Economic | $T_{idle}$ | 1.7 |
| | | Average | $C_{power\,red}*T_{max,\,climb}$ | 1.7 |
| | | Max climb angle | $T_{max,\,climb}$ | 1.7 |
| Descent | Increase | Economic | $T_{des}$ | 1.1 |
| | | Average | $T_{des}$ | 1.4 |
| | | Max descent angle | $T_{des}$ | 1.7 |
| | Decrease | Economic | $T_{des}$ | 0.7 |
| | | Average | $T_{des}$ | 0.5 |
| | | Max descent angle | $T_{des}$ | 0.3 |
| Cruise | Accelerated | | $C_{power\,red}*T_{max,\,climb}$ | 0 |
| | Constant speed | | D | 0 |
| | Decelerated | | $T_{des}$ | 0 |

Indeed, four modes were adopted for thrust T, such as:
1) Maximum Climb Thrust ($T_{max,climb}$). It is a thrust level that could be sustained only for a short time by engines. Typically, it is used for initial climb during takeoff. It is the continuous maximum thrust limit reported in aircraft manual (sec. 3.7.1 of [1]);
2) Reduced Climb Power. In order to avoid engine wear and excess fuel consumption, standard climbs are realized with a reduced power consumption correction factor ($C_{power\,red}$) as reported in sec. 3.8 of [1];
3) Maximum Cruise Thrust ($T_{max,cruise}$). It is the maximum thrust allowed during cruise phase (sec. 3.7.2 of [1]);
4) Descent Thrust ($T_{des}$). It depends on altitude and flight phase (sec. 3.7.3 of [1]).

All thrust laws depend on $T_{max,climb}$. It is a function of engine type, h, $V_{TAS}$, and temperature.

In order to simulate pilot behavior, a proper control was introduced on longitudinal acceleration so that T is properly reduced to avoid constraint infringement of aforesaid parameter. Indeed, also human and automatic pilots perform the same control during real flights to keep the aircraft within acceleration safety boundaries.

Minimization of the Computational Load

Each phase reported above with reference to FIG. 1 has been coded so that the number of computations is optimized for the specific application.

Therefore, when TAS or level is constant all terms that are constant with TAS or level have been computed only during initialization. Moreover, during steady cruise flight the single step analytical solution described above was applied. A test with specific benchmarking tools [12] reported a reduction of more than 30% in the mean computational load.

Check of Flight Envelope Constraint

Flight envelope is defined on the basis of the BADA™ database. One performs a check of position inside the envelope for the initial state and at every integration step. Also temperature effect was accounted for. Indeed, temperature variations from standard atmosphere model up to 10° C. could produce an error up to 10% in the determination of d. This effect had an important impact on turbojet aircraft trajectory prediction performances. For the definition of the flight envelope within the TEM model seven types of constraint on status are provided:

1) Maximum CAS $V_{MO}$ that accounts for maximum Lift and Drag levels;
2) Maximum Mach number $M_{MO}$ that accounts for effects of air compressibility;
3) Maximum altitude $h_{max/act}$ for a given aircraft mass m and temperature T;
4) Minimum CAS $V_{min}$ that is determined by stall;
5) Buffet Mach number $M_b$ that is a limit due to vibrations induced in jet engines;
6) Maximum longitudinal acceleration $acc_{long\,max}$ that is determined by flight regulations;
7) Maximum normal acceleration $acc_{norm\,max}$ that is determined by flight regulations.

Constraints (1-5) were Flight Envelope constraints depending on aircraft type and flight status, whereas constraints 6 and 7 were global aircraft constraints.

Inclusion of Takeoff and Landing by Means of Kinematic Models

The aircraft data included in the BADA™ data base does not allow for direct dynamical integration of aircraft vertical trajectory for flight phases below 3000 ft. In particular, this is due to a not negligible modification of standard models of drag and thrust in these phases. Indeed, aerodynamic drag must account for ground effect while thrust has specific issues that cannot be derived from the analysis of radar tracks during cruise, i.e. the way BADA database is compiled.

The model proposed by the present invention is based on a dynamical inversion of TEM equations (3.1). The aircraft vertical trajectory is assumed to be equal to the one reported by ICAO in its regulations. The dynamical terms, i.e. drag and thrust, are derived in each segment of takeoff and landing phases as reported farther in the following (explanations leading to equations A) together with a description of the implemented routines.

Determination of Integration Pitch

Another important aspect that was taken into account was the selection of pitch for time integration. Because of the calls to the various services, the distance travelled by the airplane can be remarkable, an integration strategy with variable pitch has been chosen, namely the maximum values of integration pitch were assigned considering maximum allowed altitude and true air speed variations.

Figure 11:
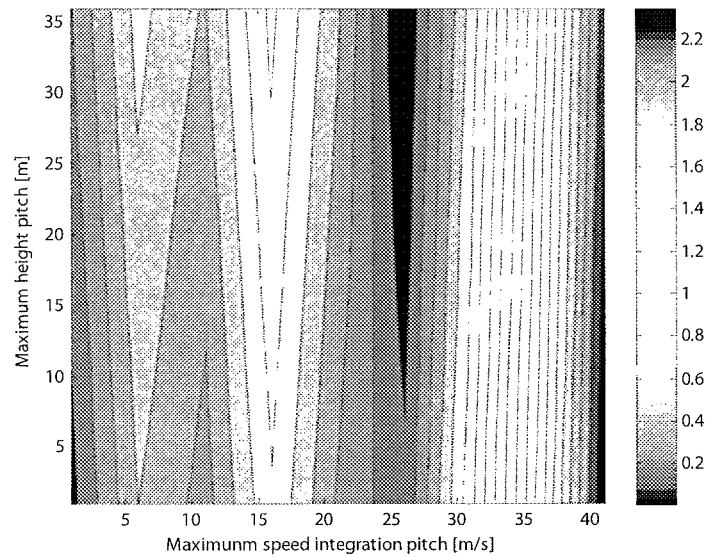
FIG. 11 shows a contour plot resulting from typical simulation run on tas and altitude pitches (the color bar reports the percent error with respect to minimum pitch (1 m,1 m/s)), according to the invention.

A proper procedure was selected to estimate the values of maximum integration pitches to address the minimum computational load at an acceptable accuracy level. Simulations used to test climb, descent, and cruise phases where repeated for uniformly distributed pairs of speed and height pitches ranging from minimum (1 m, 1 m/s) to (300 m, 100 m/s). For each run, contour plots similar to the one reported in FIG. 11 were carried out. They reported the percent error of each pair of speed and height pitches with respect to the pair (1 m, 1 m/s) that was estimated to be the most accurate. The optimal pitches were selected considering the criterion that they should represent the point that had an error of less than 1% and it was also the most distant from (1 m, 1 m/s). Such an analysis produced the choice of the integration pitches (40 m, 25 m/s). FIG. 3 reports the results of tests of 151 climb conditions compared to the ones output by BADA Tools™ developed by EUROCONTROL™. It is worth noting that the mean error was in the order of 0.1% and rms error changed slightly from 9% to 10% whereas the total number of computations was critically reduced. Pitch selection had no effect on cruise at constant speed, since the tool was capable to compute the aircraft mass at the end of cruise segment in a single computational step.

Performance Status Reassignment

Another important aspect that was taken into account was the possibility of reassigning the target performance status in case it lies outside the flight envelope. Indeed, some implemented modes require the aircraft reaches a target level (reach a level) or target speed and level (reach a speed). In this cases, it is not enough to check that the target performance status lies within the initial flight envelope, since it may move outside the actual flight envelope during the integration process. To overcome this problem specific methods have been developed and implemented in order to check for target performance status inclusion in the actual flight envelope and reassign it in case it lies outside the actual flight envelope, which is affected by actual mass and atmospheric conditions.

Let suppose that a target performance status has been assigned:

$X_T = \{CAS, h\}$

Figure 12:
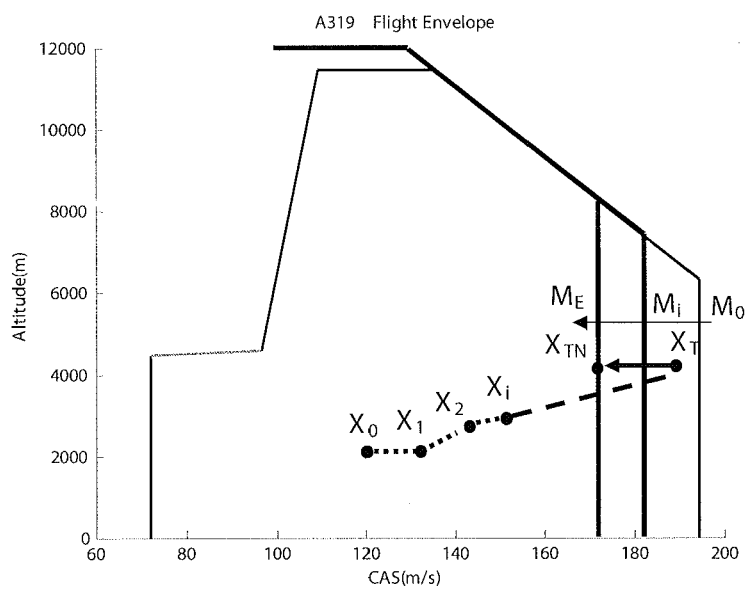
FIG. 12 shows a target performance status reassignment logic, according to the invention.

Starting from an initial performance status, given initial mass $M_0$ and temperature at sea level, $T_{sl}$, we can easily check for target performance status inclusion in the flight envelope corresponding to the initial mass and temperature at sea level (blue boundary in FIG. 12). In the following, for the sake of brevity, we consider only the effect of the aircraft mass.

Let suppose that at the i-th integration step, at which the airplane mass is reduced from $M_0$ to $M_i$, the maximum speed boundary of the flight envelope moves to the left (red boundary in FIG. 12) leaving the target performance status now outside the actual flight envelope. The target performance status becomes now unfeasible, and needs to be re-assigned.

The implemented logic relies on computing the nearest target performance status on the red boundary and then shifting the target performance status to the point on the black boundary ($X_{TN}$) computed by applying a safe margin to the nearest target status. This procedure is repeated each time the target performance status moves outside the actual flight envelope and the safe margin is computed so to reduce the number of times the procedure is applied. However, it is sufficiently small so to keep small the difference between the reassigned target status and the original one.

The implemented procedure provides also an estimate of the speed derivative with respect to altitude evaluated as the inverse of the slope of the line connecting the actual performance status to the target one. Indeed, this quantity can be used in the choice of the most appropriate energy share factor, i.e. the most appropriate aircraft attitude, to reach the desired performance status.

Figure 13:
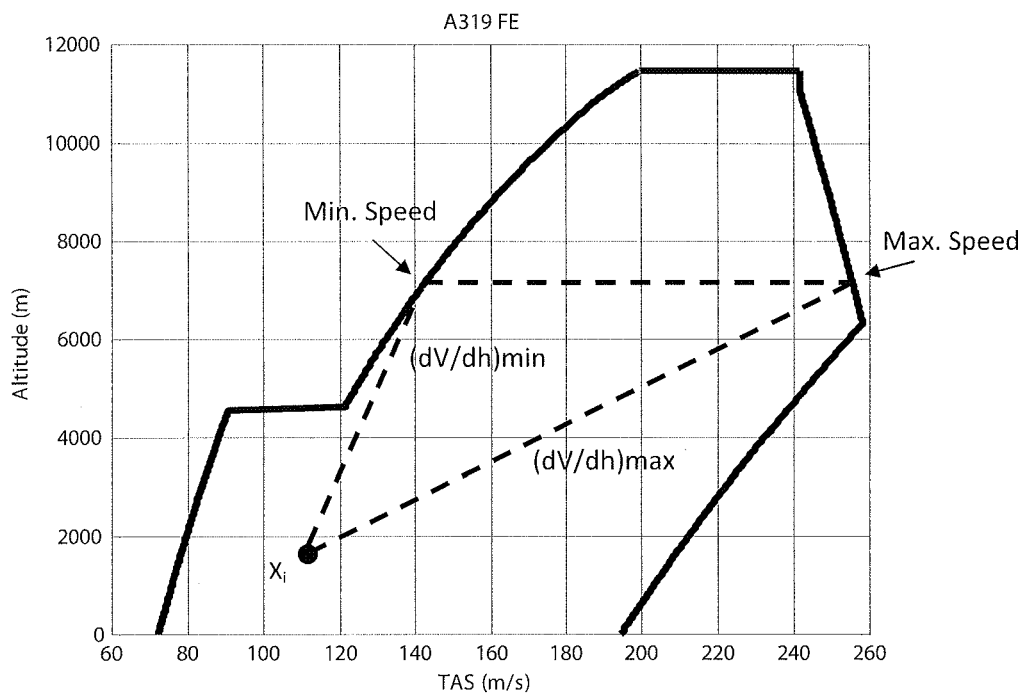
FIG. 13 shows target level speed margins, according to the invention.

In case only a target level is specified (reach a level mode), the above procedure concerning the calculations of the margins with respect to the flight envelope allows computing the admissible speed range corresponding to that target flight level on the actual flight envelope (see FIG. 13). This information can be used to drive the integration process toward the target altitude without violating the flight envelope in terms of speed. In addition, the procedure provides also the speed derivative with respect to altitude evaluated as the inverse of the slope of the lines connecting the actual performance status, X, to the points corresponding to the minimum and maximum admissible speeds at the target altitude. These values provides a range of admissible slopes that can be used to shape the Energy Share Factor used to reach the target altitude.

Performance Status Margins

Figure 14:
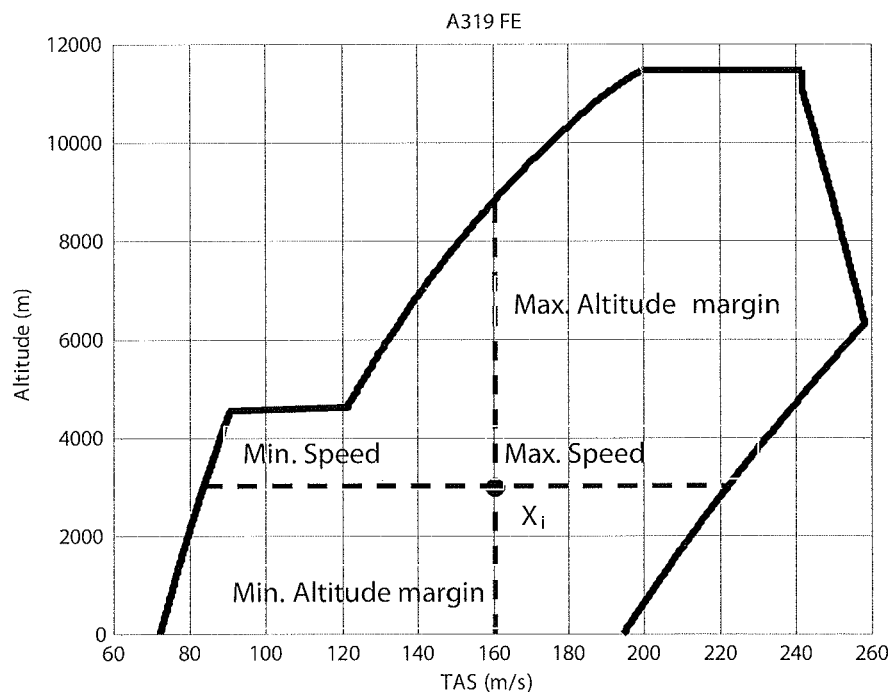
FIG. 14 shows a performance status margins definition, according to the invention.

Another implemented innovative solution concerns the computation of the actual performance status margins (speed and altitude) with respect to the actual flight envelope boundary. The margins are defined as in FIG. 14. The knowledge of the actual values of these margins allows properly driving the integration process, in terms of time, speed and/or altitude variations, to avoid that the actual performance status moves outside the flight envelope, which can cause a failure in the integration process.

Evaluation of Wind Effect

The developed method tool can estimate the effect of wind on aircraft performance status. This effect is given by estimating the following terms:

1. Aircraft ground speed (GS) as a function of true air speed (TAS) and wind speed (WS);
2. Aircraft heading $\psi$ as a function of course angle $\beta$, TAS, and WS.

For the first term the following method has been carried out. The demonstration needs that the Aircraft Groundspeed Reference Frame (AGRF) is defined. It is the frame that has x axis alongside current groundspeed direction, y axis in the horizontal plane and normal to x axis, z axis alongside vertical direction. It results that x axis is tangent to aircraft ground trajectory, i.e. longitudinal axis, whereas y axis is normal to aircraft ground trajectory, i.e. lateral axis. Let WS have the following components in the AGRF frame:

$$WS = \begin{bmatrix} WS_{Long} \\ WS_{Lat} \\ 0 \end{bmatrix} \quad (6.11)$$

These components are given from meteo information in each point of the aircraft trajectory. It is worth noting that the vertical wind speed is non negligible only for short term not stationary events such as wind gusts and wind shares. Moreover, it is not reported in meteo information.

In the same reference frame, GS is given as:

$$GS = \begin{bmatrix} GS_{Long} \\ 0 \\ VRCD \end{bmatrix} \quad (6.12)$$

while aircraft TAS=GS−WS can be estimate as:

$$TAS = \begin{bmatrix} GS_{Long} - WS_{Long} \\ -WS_{Lat} \\ VRCD \end{bmatrix} \quad (6.13)$$

Since VRCD and the norm of TAS are estimated by means of integration of TEM equations (3.1), the determination of GS is completed once GS-Long is computed. The square of the norm of TAS can be derived from (6.13):

$$TAS^2 = (GS_{Long} - WS_{Long})^2 + WS_{Lat}^2 + VRCD^2 = \quad (6.14)$$
$$= GS_{Long}^2 + WS_{Long}^2 - 2GS_{Long}WS_{Long} +$$
$$WS_{Long}^2 + VRCD^2$$

Equation (6.14) is a quadratic equation in $GS_{Long}$ that admits the following solutions:

$$GS_{Long} = WS_{Long} \pm \sqrt[2]{WS_{Long}^2 - WS_{Long}^2 - WS_{Lat}^2 - VRCD^2 + TAS^2} = \quad (6.15)$$
$$= WS_{Long} \pm \sqrt[2]{TAS^2 - WS_{Lat}^2 - VRCD^2}$$

Since $GS_{Long}$ must be positive for aircrafts, the negative sign before the square root in equation (6.15) must be discarded. As a consequence, the resulting value of $GS_{Long}$ is:

$$GS_{Long} = WS_{Long} \pm \sqrt[2]{TAS^2 - WS_{Lat}^2 - VRCD^2} \quad (6.16)$$

Figure 15:
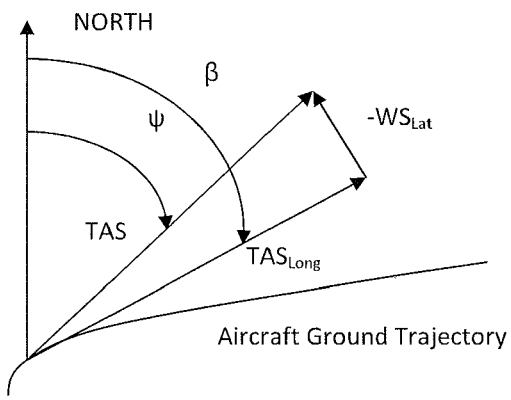
FIG. 15 shows a course vs. Heading diagram, according to the known art and standards (icao)

The aircraft heading ψ, i.e. the angle between the north direction and the aircraft longitudinal axis, can be determined once the course angle β, i.e. the angle between the north direction and the horizontal ground speed direction, is given. The method to extract ψ is reported in FIG. 15. It results:

$$\psi = \beta - \arctg\left(\frac{-WS_{Lat}}{TAS_{Long}}\right) \quad (6.17)$$
$$= \beta - \arctg\left(\frac{-WS_{Lat}}{GS_{Long} - WS_{Long}}\right) =$$
$$= \beta - \arctg\left(\frac{-WS_{Lat}}{\sqrt[2]{TAS^2 - WS_{Lat}^2 - VRCD^2}}\right)$$

Applications that can be Improved by Using the Proposed Invention

The following applications can make use of the developed algorithm:

1. Flight Data Processing software for Air Traffic Management applications. In this case, the algorithm can be used to predict vertical motion and performance status of all aircrafts in a controlled region in order to perform conflict detection and resolution. The algorithm can be used for both strategic planning and real-time tactical re-planning;
2. Air Traffic Simulation tools for professional and gaming applications. Professional applications include testing of innovative flight procedures, e.g. continuous descent flight. The algorithm can be used for real-time simulations of aircraft behavior after a specific command is issued from a controller. The tool can be installed into Flight Controllers Training Units, i.e. the units that are used to train Flight Controllers with Synthetic Air Traffic Conditions. In this case, the tool can estimate aircrafts response to Controllers' commands;
3. The tool can be used by innovative onboard avionic instruments, such as next generation Traffic Collision Avoidance Systems or a Bad Weather Avoidance System. In this case, it can be adopted to simulate aircraft behavior if a proper automatic command is issued to avoid dangerous conditions.

Takeoff and Landing Models

Landing Model Equations

In the following it is assumed that:
The airplane moves only in the longitudinal plane
The airplane is in complete trim, i.e. no net pitching, rolling and yawing moments exist.

Figure 16:
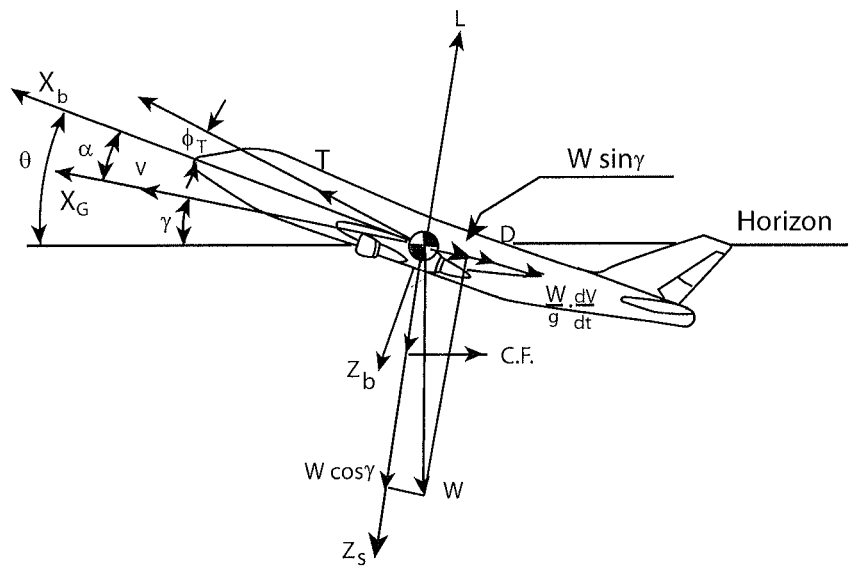
FIG. 16 shows a definition scheme of the forces acting on an airplane [4], according to the known art and standards.

Thus the only allowed accelerations are the ones along and perpendicular to the flight path. Under these assumptions, with reference to FIG. 16, the equations of motion of the airplane projected along and perpendicularly to the flight path are:

$$T\cos\alpha - D - W\sin\gamma = \frac{W}{g}\frac{dV}{dt} \quad (A.1)$$
$$T\sin\alpha + L - W\cos\gamma = \frac{W}{g}V\dot{\gamma}$$

wherein V is the true air speed, γ is the flight path angle, L is the lift, D is the drag, T is the thrust, W the weight and g the gravity acceleration. If the thrust angle, $\Phi_T$ and the angle of attack, α, are assumed small (as typical), the two equations rewrite as:

$$T - D - W\sin\gamma \cong \frac{W}{g}\frac{dV}{dt} \quad (A.2)$$

$$L - W\cos\gamma \cong \frac{W}{g}V\dot{\gamma}$$

The airplane altitude with respect to the runway and ground range can be then computed by the following kinematic relations:

$$\frac{dh}{dt} = V\sin\gamma \quad (A.3)$$

$$\frac{dx}{dt} = V_g\cos\gamma$$

where $V_g$ is the ground speed evaluated as the sum of the true air speed and the wind speed:

$$V_g = V + V_w \quad (A.4)$$

In the following, V indicates the True Air Speed (TAS) and $V_c$ indicates the Calibrated Air Speed (CAS).

Glide Approach

During the approach, the airplane is flown along a straight line flight path [4] with an approach speed which must satisfy the following CAS constraint until the airplane reaches the obstacle height (50 ft for both 23 and 25 Federal Aviation Regulations, FAR):

$$V_{CA} \geq V_{Cmin,AP} = 1.3 \cdot V_{st,AP} \quad (A.5)$$

where $V_{st,AP}$ is the stalling speed in approach. During the final approach the airplane must be configured to the landing configuration, i.e. gear down and flaps in the landing position. Differently from the approach speed, the touchdown speed is not specified by FAR's, but it is typically approximated as [4]:

$$V_{TD} \geq 1.15 \cdot V_{st,AP} \quad (A.6)$$

By multiplying the first of equations (A.2) by V and using the first of equation (A.3) we have:

$$(T-D)V = WV\sin\gamma + \frac{W}{g}V\frac{dV}{dt} \Rightarrow (T-D)V = W\frac{dh}{dt} + \frac{W}{g}V\frac{dV}{dt} \quad (A.7)$$

This equation is the one provided also in the TEM model [2], and it can be used to model the airplane motion from the initial altitude, $h_o$, and CAS speed, $V_{Co}$, to the altitude and speed at the flare starting. Specifically, since in the approach phase the CAS is constrained to be higher than a minimum (see eq. A.5), a CAS schedule is imposed from the initial CAS speed at the initial height so to have the minimum required approach speed at the screen height:

$$V_C = \frac{(h - h_o)V_{CA,screen} + (h_{screen} - h)V_{Co}}{h_{screen} - h_o} \quad (A.8)$$

This CAS schedule is converted into a TAS schedule by using the CAS to TAS conversion formulas provided in the TEM model [3].

Since the flight path angle is kept constant during descent, this additional condition determines that both CAS and ROCD (Rate of Climb/Descent) are controlled during approach. As a consequence, equation (A.7) can be used to evaluate the required thrust as follows:

$$T = W\sin\gamma + \frac{W}{g}\frac{dV}{dt} + D \quad (A.9)$$

Of course, it must be controlled that this thrust is not lower than the idle thrust and not higher than the landing thrust as provided in the TEM model [3], i.e the following condition must be satisfied:

$$T_{idle} \leq T \leq T_{landing} \quad (A.10)$$

where the thrust in landing is evaluated as follows [3]:

$$T_{landing} = C_{Tdes,ld}T_{max,climb} \quad (A.11)$$

In equation (A.11), $T_{max,climb}$ is the maximum thrust in climb provided for the different airplanes in the TEM model and $C_{Tdes,ld}$ is the thrust correction factor for the landing phase [3].

Once speed, flight path angle and thrust have been evaluated, the airplane altitude and ground range can be computed by integrating the two kinematic equations (A.3). In addition, the nominal fuel flow, $f_{nom}$, can be evaluated according to the formulas reported in the TEM model for the different airplanes [3], thus the fuel consumption can be computed as a function of time as:

$$m_f = f_{nom} \cdot t \quad (A.12)$$

and the airplane mass is determined as:

$$m = m_o - m_f \quad (A.13)$$

where $m_o$ is the initial airplane mass.

Finally, the longitudinal deceleration during approach can be easily computed from the variation imposed on the TAS. Of course, since the flight trajectory is a straight line, the acceleration perpendicular to it is zero.

Flare

Figure 17:
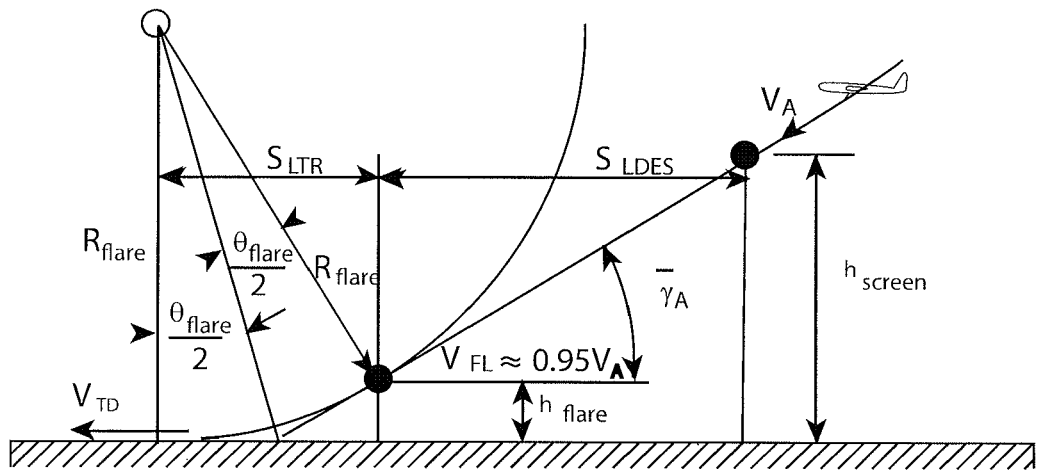
FIG. 17 shows a schematic representation of the landing flare phase [4] of an aircraft.

The flare maneuver is modeled as in [4]: the flight path is a curved line, normally assumed to be circular (see FIG. 17). During the flare the airplane decelerates to the touchdown speed. Thus, an average flare speed can be defined and used to compute the flare parameters:

$$V_f \cong 1.23 \cdot V_{st,AP} \cong 0.95 \cdot V_{Cmin,AP} \quad (A.14)$$

During flare the lift must balance the airplane weight and the centrifugal force produced by the curved flight path, i.e. we have:

$$L = W + \frac{W}{g}\frac{V_{flare}^2}{R_{flare}} = \frac{1}{2}\rho C_{Lflare}V_{flare}^2 S \quad (A.15)$$

where $\rho$ is the atmospheric density, S the wing surface and $R_{flare}$ is the flare radius. Let we take:

$$C_{LWeight} = \left(\frac{2W/S}{\rho}\right)\frac{1}{V_{flare}^2} = \frac{V_{flare1}^2}{V_{flare}^2} \quad (A.16)$$

where $V_{flare\,1}$ is the flare speed under unitary lift coefficient. From (A.15) and (A.16), the lift coefficient during the landing flare can be computed as:

$$C_{Lflare} = C_{LWeight} + \Delta C_{Lflare} \quad (A.17)$$

where $\Delta C_{Lflare}$ is the lift coefficient increment needed to curve the airplane trajectory given by:

$$\Delta C_{Lflare} = \left(\frac{2W/S}{\rho}\right)\frac{1}{gR_{flare}} \quad (A.18)$$

The change in the lift coefficient is assumed to be instantaneous [4]. Thus we have:

$$C_{Lflare} = \frac{V_{flare1}^2}{V_{flare}^2} + \Delta C_{Lflare} \quad (A.19)$$

$$= \frac{V_{flare1}^2}{V_{st,AP}^2}\frac{V_{st,AP}^2}{V_{flare}^2} + \Delta C_{Lflare}$$

$$= C_{Lmax,AP}\frac{V_{st,AP}^2}{V_{flare}^2} + \Delta C_{Lflare}$$

since:

$$C_{Lmax,AP} = \frac{2W/S}{\rho V_{st,AP}^2} = \frac{V_{flare1}^2}{V_{st,AP}^2} \quad (A.20)$$

Finally, the lift during flare is given as:

$$L = \frac{1}{2}\rho V_{flare}^2 S\left[C_{Lmax,AP}\frac{V_{st,AP}^2}{V_{flare}^2} + \Delta C_{Lflare}\right] \quad (A.21)$$

Figure 7:
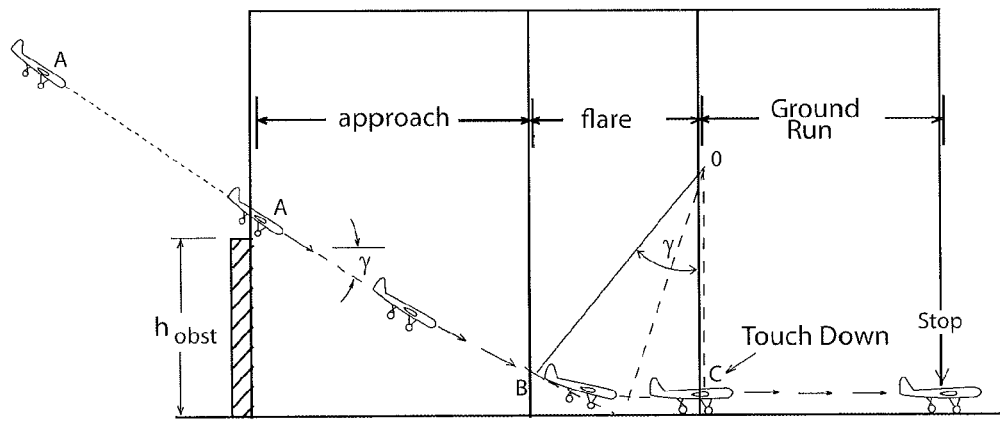
FIG. 7 shows a schematic representation of the landing phase of an aircraft ([based on ref. 2])

The flare radius can be computed from eq. (18):

$$R_{flare} = \left(\frac{2W/S}{\rho}\right)\frac{1}{g\Delta C_{Lflare}} \quad (A.22)$$

$$= \left(\frac{2W/S}{\rho}\right)\frac{C_{LWeight}}{C_{LWeight}}\frac{1}{g\Delta C_{Lflare}}$$

$$= V_{flare1}^2 \frac{V_{flare}^2}{V_{flare1}^2} C_{LWeight}\frac{1}{g\Delta C_{Lflare}} \Rightarrow$$

$$R_{flare} = \frac{V_{flare}^2}{g}\frac{C_{LWeight}}{\Delta C_{Lflare}} \cong \frac{V_f^2}{g}\left(\frac{1}{n_{flare}-1}\right)$$

wherein $n_{flare}$ is the load factor during flare. It depends on pilot technique, and it is usually between 1.04 and 1.08[4]. Once the flare radius has been computed, with reference to FIG. 7, the flare height as a function of γ can be determined as:

$$h_{flare} = R_{flare}(1-\cos\gamma) \quad (A.23)$$

with γ being $\theta_{flare}$ in FIG. 17. The ground range is instead determined as a function of time as follows:

$$x_{flare} = V_g \cdot t_{flare} \quad (A.24)$$

where the flare time can be estimated as $$t_{flare} \cong \frac{R_{flare}\sin\gamma}{V_f} \quad (A.25)$$

and the ground speed is give as $$V_g = V\cos\gamma + V_w \quad (A.26)$$

being $V_w$ the wind speed parallel to the ground.

From equation (22), the lift coefficient increment can be computed as:

$$\Delta C_{Lflare} = C_{LWeight}(n_{flare}-1) \quad (A.27)$$

and the lift coefficient during flare as:

$$C_{Lflare} = n_{flare}C_{LWeight} = n_{flare}\frac{V_{flare1}^2}{V_{flare}^2} \quad (A.28)$$

Then, the drag coefficient during flare can be computed using the formulation provided in the TEM model [3]:

$$C_{Dflare} = C_{D0,LD} + C_{D0,GEAR} + C_{D0,LD}\cdot C_{Lflare}^2 \quad (A.29)$$

The drag force is thus computed as:

$$D_{flare} = \frac{1}{2}\rho C_{Dflare}SV_{flare}^2 \quad (A.30)$$

Also the flare angular velocity can be computed as:

$$\dot\gamma_{flare} = \frac{V_{flare}}{R_{flare}} \quad (A.31)$$

The longitudinal deceleration during flare can be computed by using eq. (A.7) as:

$$a_{long} = \frac{dV}{dt} = \frac{g}{W}(T_{idle} - D_{flare} - W\sin\gamma) \quad (A.32)$$

while the acceleration perpendicular to the flight path is given as:

$$a_{perp} = V_{flare}\dot\gamma \quad (A.33)$$

Finally, the ROCD is evaluated as:

$$\frac{dh}{dt} = V_{flare}\sin\gamma \quad (A.34)$$

Transition to Climb Phase

Figure 18:
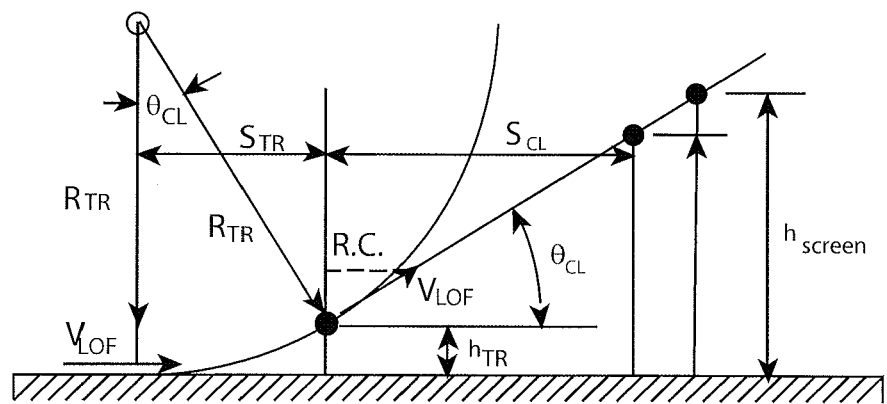
FIG. 18 shows a schematic representation of transition to climb [4] phase of an aircraft.

The transition is defined as the phase in which the flight path angle γ goes from 0 (value at the end of the ground roll) to its constant value of the initial climb phase. The transition phase is modeled according to the geometry in FIG. 18.

The flight path is assumed to be circular, and the velocity is assumed to be constant, i.e. $V=V_{LO}$. Thus, the transition phase mainly consists of a rotation of the TAS from being parallel to the runway to being inclined at the initial climb flight path angle.

As in the flare maneuver, the lift shall balance the airplane weight and produce the centripetal acceleration needed to curve the trajectory:

$$L = W + \frac{W}{g}\frac{V_{LO}^2}{R_{TR}} \quad (A.35)$$

This additional lift is the effect of an excess in the lift coefficient beyond the 1-g one, $\Delta C_L$, which produces the centripetal acceleration given as:

$$\Delta C_L = \frac{W}{g} \frac{V_{LO}^2}{R_{TR}} \frac{2}{\rho V_{LO}^2 S} = \left(\frac{2W}{\rho S}\right) \cdot \frac{1}{g} \cdot \frac{1}{R_{TR}} = \frac{V_{L1}^2}{R_{TR}} \quad (A.36)$$

In which $V_{L1}^2$ is the liftoff speed under unitary lift coefficient.

Ref. 3 suggests employing the following equation for computing $\Delta C_L$ derived from operational data:

$$\Delta C_L = \frac{1}{2}\left[\left(\frac{V_{LO}}{V_{st,TO}}\right)^2 - 1\right]\left\{C_{Lmax,TO}\left[\left(\frac{V_{st,TO}}{V_{LO}}\right)^2 - 0.53\right] + 0.38\right\} \quad (A.37)$$

Assuming, as usual, that lift-off occurs at 120% of stall speed, we have the following expression for $\Delta C_L$:

$$\Delta C_L = \frac{1}{2}[1.2^2 - 1]\{C_{Lmax,TO}[1.2^{-2} - 0.53] + 0.38\} \quad (A.38)$$

where $$\frac{\rho S(V_{st,TO})^2}{2} C_{Lmax,TO} = W \Rightarrow C_{Lmax,TO} \quad (A.39)$$

$$= \left(\frac{V_{L1}}{V_{st,TO}}\right)^2$$

$$= (1.2)^2 \left(\frac{V_{L1}}{V_{st,TO}}\right)^2$$

Thus, the radius of curvature during the transition phase can be computed as:

$$R_{TR} = \frac{V_{L1}^2}{g} \cdot \frac{1}{\Delta C_L} \quad (A.40)$$

and the lift coefficient is given by:

$$C_{LTR} = C_{LW} + \Delta C_L = \frac{2W}{\rho S V_{LOF}^2} + \Delta C_L = \frac{V_{L1}^2}{V_{LOF}^2} + \Delta C_L \quad (A.41)$$

whereas the drag coefficient is evaluated as a function of the lift coefficient using the TEM model [3].

Figure 19:
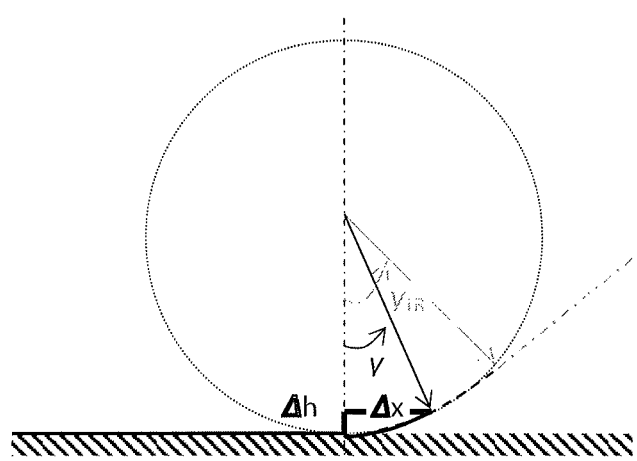
FIG. 19 shows a schematic representation of geometry of transition to climb [4] phase of an aircraft.

The increment in ground range, x, and in altitude, h, during the transition phase can then be computed by the transition geometry (see FIG. 19). The transition is modeled with respect to the air mass, thus the horizontal wind effect shall be added into the x equation. The x, h equations are thus:

$$x(t) = x_0 + R_{TR} \sin \gamma(t) \pm V_w(t - t_0) \quad (A.42)$$

$$h(t) = h_0 + R_{TR}[1 - \cos \gamma(t)] \quad (A.43)$$

where $$\gamma(t) = \dot{\gamma} \cdot (t - t_0) = \frac{V_{LO}}{R_{TR}} \cdot (t - t_0) \quad (A.44)$$

In setting the transition maneuver, it must be checked that the acceleration perpendicular to the flight path is lower than the allowed maximum provided in the TEM model [3]. Thus, we have:

$$a_n = V_{LOF} \cdot \dot{\gamma} \leq a_{n\,max} \Leftrightarrow \frac{V_{LOF}^2}{R_{TR}} \leq a_{n\,max} \quad (A.45)$$

This condition translates into an allowed minimum value for the transition arc radius:

$$R_{TR} \geq \frac{V_{LOF}^2}{a_{n\,max}} \quad (A.46)$$

Finally, using eq. (41) a maximum allowed value for the lift coefficient increment can be found as follows:

$$\frac{V_{L1}^2}{g \Delta C_L} \geq \frac{V_{LOF}^2}{a_{n\,max}} \Rightarrow \Delta C_L \leq \frac{V_{L1}^2}{V_{LOF}^2} \frac{a_{n\,max}}{g} \quad (A.47)$$

Of course the longitudinal acceleration is zero.

Initial conditions for the transition model are equal to the ground roll phase's final condition, i.e. $t_0 = t_{LO}$. The initial air relative velocity becomes equal to the lift-off velocity (see eq. A.35).

The final conditions for the transition phase are obtained by imposing that the flight path angle is equal to the one for the initial climb, $\gamma_{TR}$. From TEM model [3] in climb the following expression can be used to evaluate the ROCD:

$$\frac{dh}{dt} = \left(\frac{T - D}{W}\right) \cdot V \cdot c_{powred} \cdot ESF \quad (A.48)$$

Where the power reduction coefficient is introduced to allow the simulation of climbs using less than the maximum climb setting, and is given by:

$$c_{powred} = 1 - C_{red} \frac{m_{max} - m}{m_{max} - m_{min}}; \ C_{red} = \begin{cases} 0.15 & \text{Jet Engines} \\ 0.25 & \text{T.propEng.} \end{cases} \quad (A.49)$$

The Energy Share Factor (ESF) is a measure of how much thrust is used to gain altitude with respect to gaining speed [3]. We assume that during transition the whole thrust is used to gain altitude, which means that ESF≈1.

Thus the ROCD becomes:

$$\frac{dh}{dt} \cong \left(\frac{T - D}{W}\right) \cdot V \cdot c_{powred} = V \cdot \sin \gamma \quad (A.50)$$

from which the climb angle at the end of transition can be derived as:

$$\gamma_{TR} \cong \sin^{-1}\left\{\left[\frac{T - D}{W}\right]_{V = V_{LOF}} \cdot C_{powred}\right\} \quad (A.51)$$

$$= \sin^{-1}\left\{\left[\frac{T}{W} - \frac{V_{LOF}^2}{V_{L1}^2} C_{DTR}\right] \cdot C_{powred}\right\}$$

since:

$$D = \frac{1}{2}\rho C_{DTR} V_{LOF}^2 S \Rightarrow \frac{D_{TR}}{W} \quad (A.52)$$
$$= \frac{\rho S}{2W} \cdot V_{LOF}^2 \cdot C_{DTR}$$
$$= \frac{V_{LOF}^2}{V_{L1}^2} \cdot C_{DTR}$$

The final air relative velocity will still be equal to the lift-off velocity. The transition will take a time $t_{TR}$, given by inversion of Eq. (A.44) with $\gamma(t)=\gamma_{TR}$. The altitude and the position along the runway centerline will be given by Equations (A.42), (A.43):

$$t_{TR} = t_{LO} + \frac{R_{TR}}{V_{LO}}\gamma_{TR}; \quad (A.53)$$
$$x(t_{TR}) = x_{TR};$$
$$h(t_{TR}) = h_{TR};$$
$$V(t_{TR}) = V_{LO} = 1.2 \cdot (V_{stall})_{TO}$$

As for landing, the fuel consumption is evaluated by using the TEM model for climb [3]. The airplane mass variation is then computed using eq. (A.13).

Initial Climb Phase

The initial climb phase starts when the climb angle reaches the value at the transition end and terminates at 3000 ft. Thus the initial condition for initial climb are defined as:

$$t_0 = t_{TR}$$
$$h_0 = h_{TR}$$
$$\gamma_0 = \gamma_{TR}$$
$$V_0 = V_{LOF}$$
$$x_0 = x_{TR}$$
$$m_0 = m_{TR} \quad (A.54)$$

In the present invention, the Total Energy Model (TEM) from BADA [3] is employed to describe the aircraft trajectory in the initial climb phase. In addition, we assume the CAS schedule as given by the TEM model for the different airplane categories. As an example for jet airplanes we assume the following CAS increment below 3000 ft:

$$V_C(h=3000\ ft)=(V_{LO})_{CAS}+10\ kn \quad (A.55)$$

With the above CAS, one can obtain the TAS by employing standard equations (e.g. in [3]).

The TAS schedule from the initial altitude to the final altitude (3000 ft) can be then expressed as follows:

$$V(h) = \frac{(h - h_{TR}) \cdot [V]_{h=3000\ ft} + (3000 - h) \cdot V_{LOF}}{3000 - h_{TR}} \quad (A.56)$$

The ground speed can be computed as:

$$V_g = V \cdot \cos\gamma + V_W \quad (A.57)$$

Once the TAS is available, one can compute the altitude profile by means of the TEM model [3], using the following equation:

$$\frac{dh}{dt} = \frac{(T-D)}{W} V \cdot ESF \cdot C_{pow,red} \quad (A.58)$$

where ESF is the Energy Share Factor. BADA suggests to employ ESF=0.3 as the energy share factor value for climb phases [3]. However, preliminary numerical analysis of the capability of the model to predict realistic climb rates suggests that a more realistic estimate of ESF is given by [4]:

$$ESF = \left[1 + \frac{V}{g}\frac{dV}{dh}\right]^{-1} \quad (A.59)$$

where $$\frac{dV}{dh} = \frac{[V_C(h=3000\ ft)]_{TAS} - V_{LO}}{3000\ ft - h_{rwy}} \quad (A.60)$$

Nevertheless, to ensure the continuity between the transition and initial climb phases, the ESF is evaluated by imposing the following condition:

$$\left[\frac{dh}{dt}\right]_{TR} = \left[\frac{dh}{dt}\right]_{IC} \quad (A.61)$$

This translates into the following equations for ESF:

$$\left[\frac{T-D}{W}\right]_{IC} C_{powred} \cdot ESF_{IC} = \sin\gamma_{TR} \Rightarrow ESF_{IC} \quad (A.62)$$
$$= \left\{\left[\frac{T-D}{W}\right]_{IC}^{-1} \frac{1}{C_{powred}}\right\} \sin\gamma_{TR}$$

Lift and Drag are evaluated as:

$$L = W \quad (A.64)$$
$$D = \frac{1}{2}\rho C_D V^2 S$$
$$C_D = C_{D0IC} + C_{D2IC} \cdot \frac{V_{L1}^2}{V^2}$$

The flown range is then obtained by:

$$\frac{dx}{dt} = V_g \quad (A.65)$$

And $\gamma$ is found by the height rate equation:

$$\sin\gamma = \frac{(T-D)}{W} ESF \cdot C_{pow,red} \quad (A.66)$$

Thus:

$$\frac{dx}{dt} = V\sqrt{1 - \frac{(T-D)^2}{W^2} ESF^2 \cdot C_{pow,red}^2} \quad (A.67)$$

The altitude is evaluated using eq. (A.58), whereas the consumed propellant and the mass variation are evaluated by using the TEM model for climb [3] and eq. (A.13). The longitudinal acceleration is computed from the speed schedule, whereas the normal acceleration is zero due to the straight flight path.

In the prior art, the trajectory prediction is certainly performed, but using a coarse-grained algorithm that makes use of a tabular database about the aircraft features.

Moreover, there is in the prior art a starting model for using the Eurocontrol databases. This model allows for calculations of only certain flight phases, and is therefore very limited.

The present invention adds calculation steps which were lacking in the prior art.

In the prior art, only the 2D trajectory is calculated, the altitude and the time are derived.

In the present invention one has:
Adapted the equations to the commands of the controller;
Provided an equation system and models that allow the rapid calculation with high accuracy, by considering the mass as variable.

The commands to be controlled at ground are those relevant to performing a series of codified maneuvers.

The commands in the present invention are at first in the form of words. Then they are translated into numerical inputs to a set of equations. This translation is a novelty feature of the method according to the invention, and takes the place of the statistics tables currently used.

Since the methods of the present invention allow for the managing of a dynamic situation, one can also impose constraints on the whole travel.

The equations modified according to the present invention gives a numerical output.

The old tables described the aircraft behavior by using linearization parameters. For example during a phase, a table gave the travelled length and the relevant travel time.

In the method according to the invention, there is a constant level of accuracy among the calculated parameters. On the contrary, in the prior art the least accuracy was chosen as reference.

In the prior art: first there is a predicted trajectory, then the controller makes its plannings and proceeds to possible modifications of the predicted trajectory. If during the actual flight there are "tactical" modifications of the constraints, one proceeds to recalculation of the trajectory. In the method according to the invention, the procedure is the same but the calculation is made according to the above specification.

In the case of a command that cannot be followed by the aircraft, the method according to the present invention calculates the closest performable solution.

Further, the method of the present invention uses different modeling for each phase of take-off and landing. From the regulation constraints, one has understood the effects on the particular aircraft, whilst in the prior art all the aircraft are equally treated.

The present invention gives a break-even solution between the calculations based only on tables and a complete set of differential equations, which would require huge computation resources.

In the integration of equations, according to the invention, one chooses an optimum integration pitch for the whole integration, whilst in the prior art iterations were used, thus slowing down the calculation.

Figure 20:
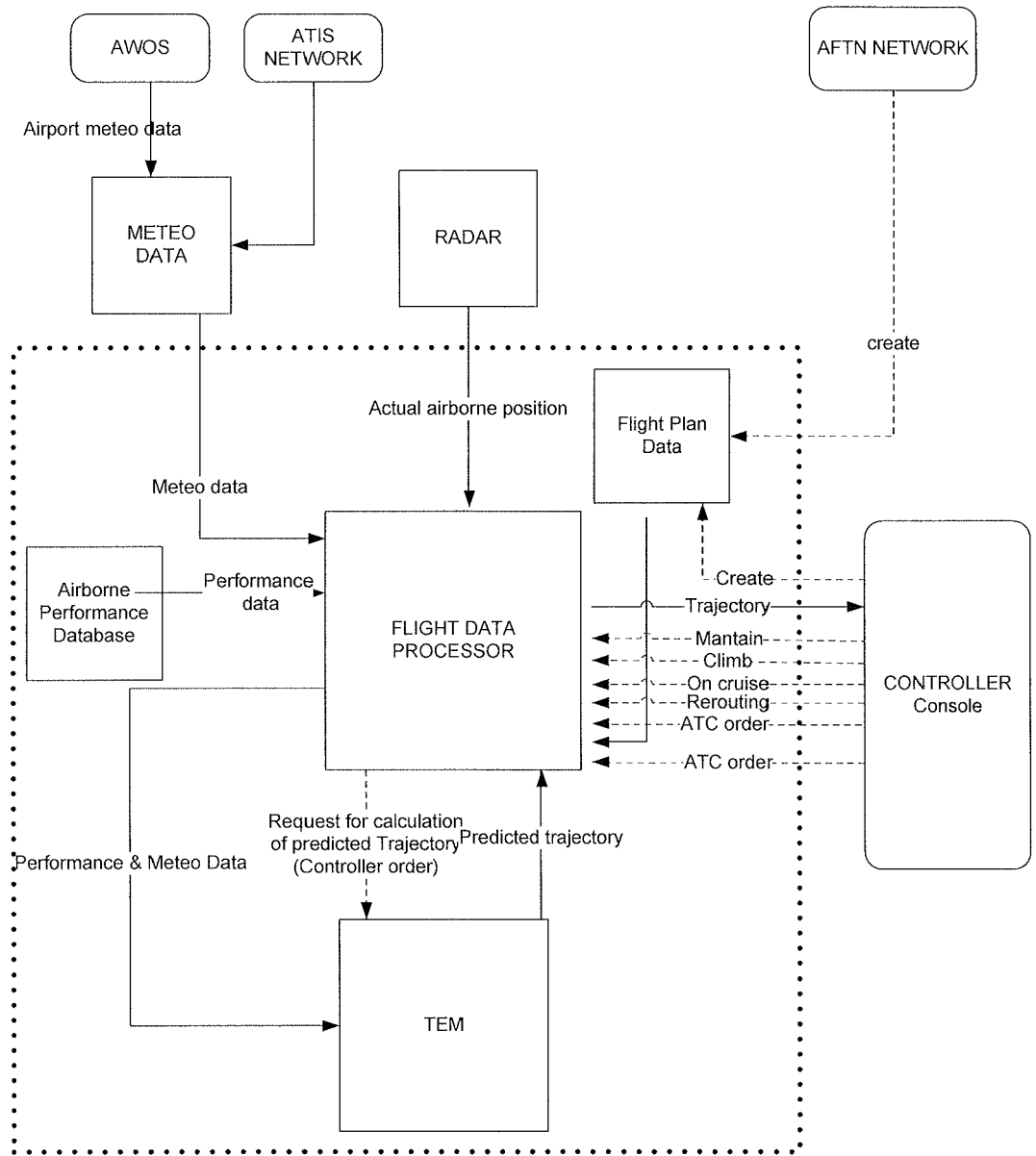
FIG. 20 shows a schematic representation of an air traffic control system according to the invention, wherein the flux of information of the present invention is implemented and used.

The present invention may be implemented in a hardware environment, according to FIG. 20 which show an air traffic control system according to the invention.

The flux of data are represented by continuous lines, whereas the flux of commands are represented with dashed lines. The dotted larger boxe comprises the flight data processor with relevant code (TEM) or memory area (flight plan data, airborne performance database with data relevant to aircraft dimensions, tank capacity etc.) blocks.

Meteo data are taken form an external data service via http or other network protocol, namely form the Automated Weather Observing System (AWOS) and Automatic Terminal Information Service (ATIS).

The actual airborne position is taken from the radar, and is utilized to trigger a re-calculation of the predicted trajectory by TEM equations, in particular for the following cases:
each time a flight plan is needed or changed, in particular before the take-off phase of the aircraft,
each time, within a fixed flight plan, the difference between the actual position of the aircraft, given by a radar detection, and the predicted position is larger than a predefined threshold.

From the controller console commands corresponding to the trajectory calculation in the various trajectory phases are sent to the flight data processor which creates a flight plan and calculate TEM equations on the basis of all the other parameters it receives from the various hardware and networks. The flight plan, in particular is created upon reception of command from the Automated Fixed Telecommunication Network (AFTN) or other Entity or Institution.

Once the trajectory is calculated, it is sent to the operator console and displayed on the display of the operator monitoring the situation of the aircraft and air traffic.

References

[1] Nuic, A., User Manual for the Base of Aircraft Data (BADA)—Revision 3.6, EUROCONTROL, EEC Note No. 10/04, July 2004.

[2] Pamadi, B. N., Performance, Stability, Dynamics, and Control of Airplanes, Second Edition, American Institute of Aeronautics and Astronautics, Reston VA, 2004.

[3] Roskam, J, Chan-Tau, E. L., "Airplane Aerodynamics and Performance", 1997.

[2] SESAR Consortium, Work Programme for 2008-2013, Doc. SESAR Consortium No. DLM-0710-002-01-00, Bruxelles, Belgium, April 2008.

[4] Joint Planning and Development Office, Concept of Operations for the Next Generation Air Transporation System, v.2.0, June 2007.

[5] Cistone, J., "Next Century Aerospace Traffic Management: The Sky is No Longer the Limit," AIAA Journal of Aircraft, Vol. 41, No. 1, 2004, pp. 36-42.

[6] Wu, S. F. and Guo, S. F., "Optimum Flight Trajectory Guidance Based on Total Energy Control of Aircraft," AIAA Journal of Guidance, Control, and Dynamics, Vol. 17, No. 2, 1994, pp. 291-296.

[7] Slattery, R. and Zhao, Y., "Trajectory Synthesis for Air Traffic Automation," AIAA Journal of Guidance, Control, and Dynamics, Vol. 20, No. 2, 1997, pp. 232-238.

[8] Dupuy, M.D. and Porretta, M., "Preliminary results for a robust trajectory prediction method using advanced flight data," IEEE/AIAA 26th Digital Avionics Systems Conference, IEEE, Dallas, Tex., 2007, pp. 1.C.5-1-1.C.5-9.

[9] Gallo, E., Lopez-Leones, J., Vilaplana, M. A. E., Navarro, F. A., and Nuic, A., "Trajectory computation Infrastructure based on BADA Aircraft Performance Model," IEEE/AIAA 26th Digital Avionics Systems Conference, IEEE, Dallas, Tex., 2007, pp. 1.C.4-1-1.C.4-13.

[10] Mondoloni, S., "Development Of Key Performance Indicators for Trajectory Prediction Accuracy," IEEE/AIAA 26th Digital Avionics Systems Conference, IEEE, Indianapolis, Ind., 2006, pp. 1-11.

[11] Nuic, A., Poinsot, C., Iagaru, M-G., Gallo, E., Navarro, F. A., and Querejeta, C., "Advanced Aircraft Performance Modeling for ATM: Enhancements to the Bada Model," IEEE/AIAA 25th Digital Avionics Systems Conference, IEEE, Washington, D.C., 2005, pp. 1-12.

[12] Minka, T., "The Lightspeed Matlab Toolbox", v.1.3, Microsoft Inc., 2006, available at URL: http://research.microsoft.com/~minka/software/lightspeed/.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A computer-implemented method for controlling an aircraft's flight plan and guiding an aircraft based on prediction of the aircraft's vertical trajectory, comprising the following flight calculation modules: Takeoff; Climb; Cruise; Descent; and Landing, corresponding to relevant flight phases, wherein the following steps are executed:

calculating by a computer processor a predicted aircraft trajectory using the following total energy model (TEM) equations:

$$VRCD = \frac{(T-D)}{mg} TAS \, ESF\{M\}$$

$$m \frac{dTAS}{dt} = (T-D) - mg \frac{VRCD}{TAS} = (T-D)(1 - ESF\{M\})$$

$$\dot{m} = -f$$

$$\frac{dh}{dt} = TAS \sin\gamma$$

solving said equations for VRCD, TAS, and m where VRCD is vertical rate of climb or descent; TAS is true air speed, ESF is the energy share factor, T is thrust and D drag, m the mass of the aircraft modeled as point-mass, {M} is the Mach number depending on TAS and temperature and altitude, g is gravity acceleration, and f is fuel flow, and γ is the flight path angle;

calculating the predicted aircraft trajectory for Cruise phase, wherein only the mass is varying, by using the following analytical solution to said TEM equations:

$$t - t_0 = \frac{dist}{TAS} = \sqrt{\frac{1}{k_9 \cdot k_{10}}} \cdot \left[\tan^{-1}\left(\sqrt{\frac{k_{10}}{k_9}} \cdot m_{fin}\right) - \tan^{-1}\left(\sqrt{\frac{k_{10}}{k_9}} \cdot m_{in}\right)\right]$$

solved for mass $m_{fin}$ at the end of the cruise phase as a function of initial mass min, and wherein t is elapsed flight time, $k_9$ and $k_{10}$ are constant terms predefined according to the aircraft sending the predicted aircraft trajectory to an Air Traffic Management (ATM) controller, which decides the flight plan accordingly;

communicating, by the ATM controller the flight plan to the aircraft;

guiding the aircraft to follow the flight plan; the TEM equation being solved:

each time a flight plan is needed or changed;

each time, within a fixed flight plan, the difference between the actual position of the aircraft, given by a radar detection, and the predicted position is greater than a predefined value.

2. Method according to claim 1, wherein for the Take-off phase, which is divided into ground roll, transition and initial climb phases, the calculation of the predicted aircraft trajectory is performed by using the following analytical solutions to said TEM equations:

$$t_{TR} = t_{LO} + \frac{R_{TR}}{V_{LO}} \gamma_{TR};$$

$$x(t_{TR}) = x_{TR};$$

$$h(t_{TR}) = h_{TR};$$

$$V(t_{TR}) = V_{LO} = 1.2 \cdot (V_{stall})_{TO}$$

$$\frac{dx}{dt} = V\sqrt{1 - \frac{(T-D)^2}{W^2} ESF^2 \cdot C_{pow,red}^2}$$

that are solved by the ground travelled distance x, wherein $t_{TR}$ is the transition phase time, $t_{LO}$ is the exact time of lift-off, $x_{TR}$, the travelled distance at $t_{TR}$, $\gamma_{TR}$ the travelled angle during transition, $V_{LO}$ the lift-off TAS, h is the altitude, $h_{TR}$ the altitude at $t_{TR}$, V is the current TAS, $(V_{stall})_{TO}$ is the stall speed of the aircraft with gear down, W is the aircraft weight, $C_{pow,red}$ is the pre-defined coefficient of power reduction.

3. Method according to claim 1, wherein for the Landing phase, the calculation of the predicted aircraft trajectory is effected by using the following analytical solutions:

$$V_C = \frac{(h - h_0)V_{CA,screen} + (h_{screen} - h)V_{C0}}{h_{screen} - h_o}$$

for the glide approach, and $$\frac{dh}{dt} = V_{flare} \sin\gamma$$

for the flare, wherein h is the altitude, $h_0$ is the altitude for the beginning of glide approach, $h_{screen}$ is the decision altitude, $V_{CA, screen}$ is the CAS speed to be reached at $h_{screen}$, $V_{C0}$ is the CAS speed at $h_0$, $V_C$ the CAS speed at h; $V_{flare}$ the CAS speed during flare and gamma is the slope of the vertical trajectory during flare.

4. Method according to claim 1, wherein the integration of the TEM equations for the calculation of predicted trajectory is made by using a pair of maximum integration pitches for speed and height, in order to address the minimum computational load at an acceptable accuracy level, the maximum integration pitches pair being determined by performing the following steps:

Performing simulations, according to said TEM equations, of climb, descent, and cruise phases for uniformly distributed set of pairs of speed and height pitches ranging from a minimum values pair to a maximum values pair:

Assuming the minimum values pair as the most accurate values pair;

For each simulation, comprising climb, descent, and cruise phases, carrying out contour plots reporting the percent RMS error of each pair of speed and height pitches with respect to said minimum values pair;

Choosing the optimal pitches pair as the pair representing the point that has an error of less than a pre-defined threshold value and it is also the most distant from said minimum values pair.

5. Method according to claim 1, wherein for all the flight phases except Cruise, the TEM equations are integrated and, for any i-th, i being a positive integer number, integration step:

one checks that the calculated performance status is within a predefined target PS, comprised of a target CAS and target altitude h, calculated on the basis of a pre-defined flight envelope;

if the calculated performance status is outside the flight envelope, performing the following steps:

substituting said calculated performance status with a corrected performance status that is nearest to the boundaries of the flight envelope and to which a safe margin distance from these boundaries is added, in order to avoid that in the subsequent calculation it goes outside the flight envelope;

proceeding to the i+1-th step of integration starting with the corrected CAS and altitude h.

6. Method according to claim 1, wherein the effect of the wind is taken into account by adding the following equations to said TEM equations:

$$GS_{Long} = WS_{Long} + \sqrt[2]{TAS^2 - WS_{Lat}^2 - VRCD^2}$$

$$\psi = \beta - \arctg\left(\frac{-WS_{Lat}}{TAS_{Long}}\right) = \beta - \arctg\left(\frac{-WS_{Lat}}{GS_{Long} - WS_{Long}}\right) =$$

$$= \beta - \arctg\left(\frac{-WS_{Lat}}{\sqrt[2]{TAS^2 - WS_{Lat}^2 - VRCD^2}}\right)$$

And solving for $GS_{Long}$, that is the horizontal component of the aircraft ground speed, and for $\square$ that is the heading angle, wherein $WS_{Long}$ is the horizontal wind speed, $WS_{Lat}$ is the lateral component of wind speed, beta is the course angle.

7. Method according to claim 2, wherein for the Landing phase, the calculation of the predicted aircraft trajectory is effected by using the following analytical solutions:

$$V_C = \frac{(h - h_0)V_{CA,screen} + (h_{screen} - h)V_{C0}}{h_{screen} - h_0}$$

for the glide approach, and $$\frac{dh}{dt} = V_{flare}\sin\gamma$$

for the flare, wherein h is the altitude, $h_0$ is the altitude for the beginning of glide approach, $h_{screen}$ is the decision altitude, $V_{CA, screen}$ is the CAS speed to be reached at $h_{screen}$, $V_{C0}$ is the CAS speed at $h_0$, $V_C$ the CAS speed at h; $V_{flare}$ the CAS speed during flare and $\square$ is the slope of the vertical trajectory during flare.

8. Method according to claim 1, characterized in that the TEM equations are solved:

before the take-off phase of the aircraft.

9. Method according to claim 2, wherein the integration of the TEM equations for the calculation of predicted trajectory is made by using a pair of maximum integration pitches for speed and height, in order to address the minimum computational load at an acceptable accuracy level, the maximum integration pitches pair being determined by performing the following steps:

Performing simulations, according to said TEM equations, of climb, descent, and cruise phases for uniformly distributed set of pairs of speed and height pitches ranging from a minimum values pair to a maximum values pair:

Assuming the minimum values pair as the most accurate values pair;

For each simulation, comprising climb, descent, and cruise phases, carrying out contour plots reporting the percent RMS error of each pair of speed and height pitches with respect to said minimum values pair;

Choosing the optimal pitches pair as the pair representing the point that has an error of less than a pre-defined threshold value and it is also the most distant from said minimum values pair.

10. Method according to claim 2, wherein for all the flight phases except Cruise, the TEM equations are integrated and, for any i-th, i being a positive integer number, integration step:

one checks that the calculated performance status is within a predefined target PS, comprised of a target CAS and target altitude h, calculated on the basis of a pre-defined flight envelope;

if the calculated performance status is outside the target PS, performing the following steps:

substituting said calculated performance status with a corrected performance status determined by assigning a safe margin distance to the nearest point within the flight envelope; proceeding to the i+1-th step of integration starting with the corrected performance status, i.e. corrected CAS and altitude h.

11. Method according to claim 2, wherein the effect of the wind is taken into account by adding the following equations to said TEM equations:

$$GS_{Long} = WS_{Long} + \sqrt[2]{TAS^2 - WS_{Lat}^2 - VRCD^2}$$

$$\psi = \beta - \arctg\left(\frac{-WS_{Lat}}{TAS_{Long}}\right) = \beta - \arctg\left(\frac{-WS_{Lat}}{GS_{Long} - WS_{Long}}\right) =$$

$$= \beta - \arctg\left(\frac{-WS_{Lat}}{\sqrt[2]{TAS^2 - WS_{Lat}^2 - VRCD^2}}\right)$$

And solving for $GS_{Long}$, that is the horizontal component of the aircraft ground speed, and for $\square$ that is the heading angle, wherein $WS_{Long}$ is the horizontal wind speed, $WS_{Lat}$ is the lateral component of wind speed, beta is the course angle.

12. Method according to claim 3, wherein the integration of the TEM equations for the calculation of predicted trajectory is made by using a pair of maximum integration pitches for speed and height, in order to address the minimum computational load at an acceptable accuracy level, the maximum integration pitches pair being determined by performing the following steps:

Performing simulations, according to said TEM equations, of climb, descent, and cruise phases for uniformly distributed set of pairs of speed and height pitches ranging from a minimum values pair to a maximum values pair:

Assuming the minimum values pair as the most accurate values pair;

For each simulation, comprising climb, descent, and cruise phases, carrying out contour plots reporting the percent RMS error of each pair of speed and height pitches with respect to said minimum values pair;

Choosing the optimal pitches pair as the pair representing the point that has an error of less than a pre-defined threshold value and it is also the most distant from said minimum values pair.

13. Method according to claim 3, wherein for all the flight phases except Cruise, the TEM equations are integrated and, for any i-th, i being a positive integer number, integration step:

one checks that the calculated performance status is within a predefined target PS, comprised of a target CAS and target altitude h, calculated on the basis of a pre-defined flight envelope;

if the calculated performance status is outside the target PS, performing the following steps:

substituting said calculated performance status with a corrected performance status determined by assigning a safe margin distance to the nearest point within the flight envelope;

proceeding to the i+1-th step of integration starting with the corrected performance status, i.e. corrected CAS and altitude h.

14. Method according to claim 3, wherein the effect of the wind is taken into account by adding the following equations to said TEM equations:

$$GS_{Long} = WS_{Long} + \sqrt[2]{TAS^2 - WS_{Lat}^2 - VRCD^2}$$

$$\psi = \beta - \mathrm{arctg}\left(\frac{-WS_{Lat}}{TAS_{Long}}\right) = \beta - \mathrm{arctg}\left(\frac{-WS_{Lat}}{GS_{Long} - WS_{Long}}\right) =$$

$$= \beta - \mathrm{arctg}\left(\frac{-WS_{Lat}}{\sqrt[2]{TAS^2 - WS_{Lat}^2 - VRCD^2}}\right)$$

and solving for $GS_{Long}$, that is the horizontal component of the aircraft ground speed, and for $\psi$ that is the heading angle, wherein $WS_{Long}$ is the horizontal wind speed, $WS_{Lat}$ is the lateral component of wind speed, beta is the course angle.

15. Method according to claim 4, wherein for all the flight phases except Cruise, the TEM equations are integrated and, for any i-th, i being a positive integer number, integration step:

one checks that the calculated performance status is within a predefined target PS, comprised of a target CAS and target altitude h, calculated on the basis of a pre-defined flight envelope;

if the calculated performance status is outside the target PS, performing the following steps:

substituting said calculated performance status with a corrected performance status determined by assigning a safe margin distance to the nearest point within the flight envelope;

proceeding to the i+1-th step of integration starting with the corrected performance status, i.e. corrected CAS and altitude h.

16. Method according to claim 4, wherein the effect of the wind is taken into account by adding the following equations to said TEM equations:

$$GS_{Long} = WS_{Long} + \sqrt[2]{TAS^2 - WS_{Lat}^2 - VRCD^2}$$

$$\psi = \beta - \mathrm{arctg}\left(\frac{-WS_{Lat}}{TAS_{Long}}\right) = \beta - \mathrm{arctg}\left(\frac{-WS_{Lat}}{GS_{Long} - WS_{Long}}\right) =$$

$$= \beta - \mathrm{arctg}\left(\frac{-WS_{Lat}}{\sqrt[2]{TAS^2 - WS_{Lat}^2 - VRCD^2}}\right)$$

and solving for $GS_{Long}$, that is the horizontal component of the aircraft ground speed, and for $\Psi$ that is the heading angle, wherein WSLong is the horizontal wind speed, WSLat is the lateral component of wind speed, beta is the course angle.

17. Method according to claim 5, wherein the effect of the wind is taken into account by adding the following equations to said TEM equations:

$$GS_{Long} = WS_{Long} + \sqrt[2]{TAS^2 - WS_{Lat}^2 - VRCD^2}$$

$$\psi = \beta - \mathrm{arctg}\left(\frac{-WS_{Lat}}{TAS_{Long}}\right) = \beta - \mathrm{arctg}\left(\frac{-WS_{Lat}}{GS_{Long} - WS_{Long}}\right) =$$

$$= \beta - \mathrm{arctg}\left(\frac{-WS_{Lat}}{\sqrt[2]{TAS^2 - WS_{Lat}^2 - VRCD^2}}\right)$$

and solving for $GS_{Long}$, that is the horizontal component of the aircraft ground speed, and for □that is the heading angle, wherein $WS_{Long}$ is the horizontal wind speed, $WS_{Lat}$ is the lateral component of wind speed, beta is the course angle.

18. A method according to claim 1, wherein the results of the solutions of said equations are displayed graphically.

19. Method according to claim 1, wherein the results obtained are employed in air traffic control.

20. System for Air Traffic Management, comprising a computer processor for the calculation of the predicted trajectory and a controller of the flight providing to said computer processor natural language commands for the trajectory the aircraft has to follow, wherein said computer processor executes a translation of the natural language commands into input numerical values, and in that said computer processor executes the calculation of the method according to claim 1.

21. Computer processor, which comprises code means that execute, when run, the method according to claim 1.

22. A nontransitory tangible memory medium, readable by a computer, storing a program, wherein the program is the computer program according to claim 20.

* * * * *